US012792793B2

(12) United States Patent
Ronen et al.

(10) Patent No.: US 12,792,793 B2
(45) Date of Patent: Nov. 10, 2026

(54) SYSTEM, METHOD AND COMPUTER PROGRAM PRODUCT FOR BUILDING DESIGN AUTOMATION INCLUDING UTILITY ROUTING

(71) Applicant: Wall to Wall, LLC, Hayward, CA (US)

(72) Inventors: Noam Ronen, Be'er Tuvia (IL); Mati Cohen, Ganei Tikva (IL); Amit Haller, Belmont, CA (US); Israel Jay Klein, Kfar Saba (IL)

(73) Assignee: Wall to Wall, LLC, Hayward, CA (US)

( * ) Notice: Subject to any disclaimer, the term of this patent is extended or adjusted under 35 U.S.C. 154(b) by 973 days.

(21) Appl. No.: 18/002,719

(22) PCT Filed: Jun. 28, 2021

(86) PCT No.: PCT/IL2021/050792

§ 371 (c)(1),
(2) Date: Dec. 21, 2022

(87) PCT Pub. No.: WO2022/003679

PCT Pub. Date: Jan. 6, 2022

(65) Prior Publication Data

US 2023/0342508 A1 Oct. 26, 2023

Related U.S. Application Data

(60) Provisional application No. 63/045,437, filed on Jun. 29, 2020.

(51) Int. Cl.
*G06F 30/13* (2020.01)
*G06F 30/18* (2020.01)
(Continued)

(52) U.S. Cl.
CPC .............. *G06F 30/13* (2020.01); *G06F 30/18* (2020.01); *G06F 30/27* (2020.01); *G06F 2113/14* (2020.01); *G06F 2113/16* (2020.01)

(58) Field of Classification Search
CPC .......... G06F 30/13; G06F 30/18; G06F 30/27; G06F 2113/14; G06F 2113/16; G06F 30/20
See application file for complete search history.

(56) References Cited

U.S. PATENT DOCUMENTS

| | | | | |
|---|---|---|---|---|
| 10,666,547 | B2 | 5/2020 | Sanchez Charles et al. | |
| 2021/0073446 | A1* | 3/2021 | Levy | G06V 10/235 |
| 2023/0146207 | A1* | 5/2023 | Parekh | G06F 30/13 703/1 |

FOREIGN PATENT DOCUMENTS

CN 209695601 U * 11/2019

OTHER PUBLICATIONS

Liu et al. (CN 209695601) (Year: 2019).*
(Continued)

*Primary Examiner* — Kyle J Kingsland
(74) *Attorney, Agent, or Firm* — Morrison & Foerster LLP

(57) ABSTRACT

System and method for deploying physical connectors within walls, ceilings and floors, comprising a. Displaying a representation of a 3D structure wherein a polyhedron with faces corresponding to at least one wall defines polyhedral nets; b. Accepting human selection of locations, on the faces, for nodes e.g. water outlets, electrical outlets, or intersections between physical connectors, each node belonging to a resource network e.g. a water pipe, electrical or sewage network; and •c. for each network to be deployed in the structure: •for each of the nets, generating a graph including nodes which represent physical resource nodes respectively; and edges, which represent connectors between nodes, and weights defined for edges; scoring each net's graph and, accordingly, selecting best net/s; and deploying resource node/s, and pipes and/or cables in the structure according to
(Continued)

a routing plan which interconnects nodes and is derived from the graph generated for the best net.

21 Claims, 34 Drawing Sheets

(51) Int. Cl.
*G06F 30/27* (2020.01)
*G06F 113/14* (2020.01)
*G06F 113/16* (2020.01)

(56) References Cited

OTHER PUBLICATIONS

Khouri, Joseph et al.; "An Efficient Algorithm for Shortest Path in Three Dimensions With Polyhedral Obstacles", Productivity Center and Department of Mechanical Engineering, University of Minnesota, Minneapolis. (Year: 1987).*
Kabul, et al., Cable route planning in complex environments using constrained sampling, Proceedings of the 2007 ACM symposium on Solid and physical modeling, Jun. 2007, pp. 1-5.
Khouri, et al., Abstract, An Efficient Algorithm for Shortest Path in Three Dimensions with Polyhedral Obstacles, Proceedings of the American Control Conference, Minneapolis, 1:161-165 (Jun. 1987).
Micha Sharir, et al., On Shortest Paths in Polyhedral Spaces, Theory of Computing, Dec. 1, 1984, pp. 144-153.
Wikipedia, Net (polyhedron), https://en.wikipedia.org/w/index.php?title=Net_(polyhedron)&oldid=1035380033, Aug. 2021, pp. 1-5.
Wikipedia, Preference learning, https://en.wikipedia.org/w/index.php?title=Preference_learning&oldid=1069779998, Oct. 2022, pp. 1-4.
Wikipedia, Reinforcement learning, https://en.wikipedia.org/w/index.php?title=Reinforcement_learning&oldid=1056129752, Nov. 2021, pp. 1-16.

* cited by examiner

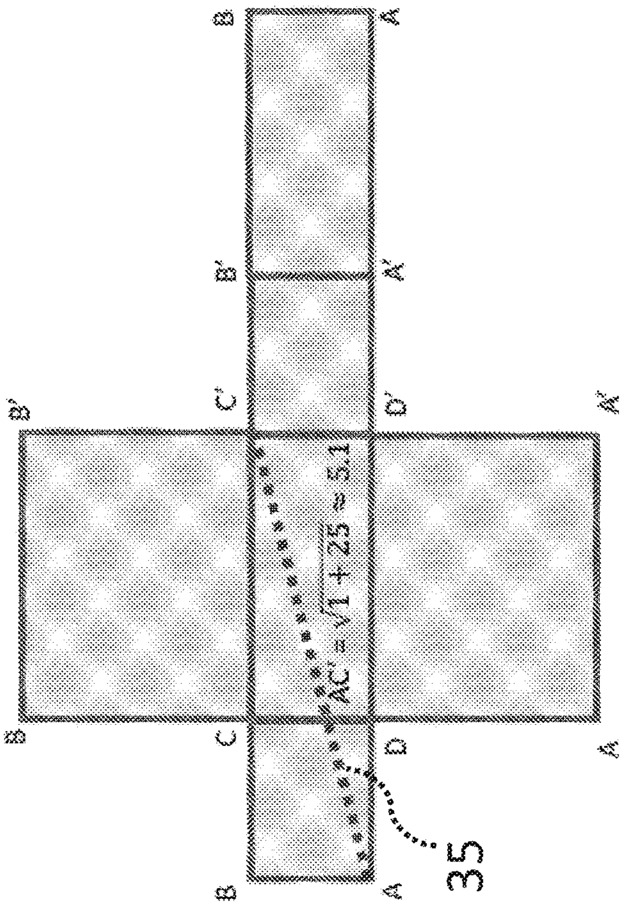
Fig. 3b
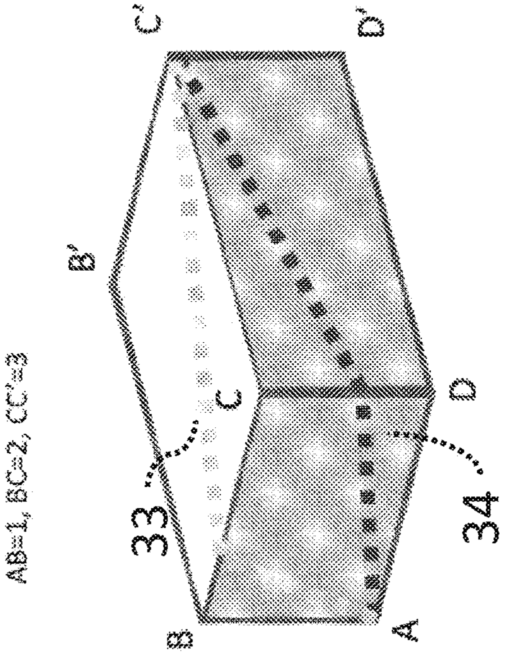

Common Area (Through Mediation) Type 3

Common Area (Through Mediation) Type 4

SYSTEM, METHOD AND COMPUTER PROGRAM PRODUCT FOR BUILDING DESIGN AUTOMATION INCLUDING UTILITY ROUTING

REFERENCE TO CO-PENDING APPLICATIONS

Priority is claimed from U.S. Provisional Patent Application No. 63/045,437 "Design automation of building resource and utility routing" filed Jun. 29, 2020, the disclosure of which application is hereby incorporated by reference.

FIELD OF THIS DISCLOSURE

The present invention relates generally to construction and more particularly to building design automation.

BACKGROUND FOR THIS DISCLOSURE

Nets aka polyhedral nets or net representations or net arrangements, are known in the computational arts and are described e.g. here: https://en.wikipedia.org/wiki/Net (polyhedron)

Reinforcement learning is known and is described e.g. in https://en.wikipedia.org/wiki/Reinforcement learning.

The disclosures of all publications and patent documents mentioned in the specification, and of the publications and patent documents cited therein directly or indirectly, are hereby incorporated by reference other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented, as appropriate.

Certain embodiments facilitate automation of the design process of resource and utility routing in building structures. When the buildings (e.g., houses, offices, apartments) are at the design stage, the resources and utilities (such as electricity, plumbing etc.) need to be routed to or deployed in different areas within the building, typically constrained by some optimization criteria such as, but not limited to, the minimization of the quantity of materials needed (e.g., as total wire length in the case of electricity routing). Building structures are three dimensional which complicates the routing design process and presents some unique challenges resolved by embodiments herein. Certain embodiments accommodate multiple resources (e.g., electricity, water) which need to co-exist within the same building structure, where each may follow different design and optimization criteria and may have different requirements.

Embodiments include:

Embodiment A1. A method for generating an optimal routing plan including performing all or any subset of the operations of FIG. 15, thereby to route at least one building resource and/or utility/ies.

Embodiment A2. A method according to any of the preceding embodiments wherein the method identifies at least one common area, and wherein, for at least one common area so identified, between adjacent rooms with certain interconnection requirements, the method is configured to perform all or any subset of:

- identify a mediation point in the common area and its location and connectivity requirements. Existence of a mediation point in a common area is optional.
- identify a logical graph of the common area representing its connectivity requirements.
- identify plural (e.g. all) possible net arrangements of the common area
- acknowledge optimization criteria to be used through the design process (e.g., minimum length of wiring, zero cost path areas, etc.).
- generate an optimal routing plan, which optimizes said criteria, for the common area e.g. by running all or any subset of the operations of FIG. 15, for at least one of (or each of) said plural possible net arrangements of the common area.

Embodiment A3. A method according to any of the preceding embodiments and also comprising resolving any coupling requirements between adjacent rooms including allowing locations of points of one room to be influenced by existence and/or location/s of point/s of another room.

Embodiment A4. A method according to any of the preceding embodiments and also comprising determining whether or not to directly connect at least one pair of points.

Embodiment A5. A method according to any of the preceding embodiments wherein plural resources are routed or distributed through the routing plan, the method also comprising a process which includes all or any subset of:

- for each of said plural resources, an optimization criterion is provided for each of said plural resources, a list of restrictions and guidelines is identified, creating corresponding connection rules;
- for each of said plural resources, all or any subset of the operations of FIG. 15 are performed, thereby to derive an optimal routing plan per each of said plural resources.

Embodiment A6. A method according to any of the preceding embodiments wherein said process is repeated using a different resource order (e.g., plumbing before electricity).

Embodiment A7. A method according to any of the preceding embodiments wherein, if varying the resource order changes optimal routing plans and/or scores thereof, a most desirable resource order is selected, and the routing plans yielded by using that resource order are provided as a system output.

Embodiment A8. A method according to any of the preceding embodiments wherein the most desirable resource order comprises:

- selecting the order which led to highest (if searching for maximum or lowest if searching for minimum) sum of scores of all plans;
- selecting the order which led to the highest (or lowest, e.g. as described above) weighted sum of all plans, where the weights are chosen according to some importance or priority factors (e.g., water plumbing optimization is prioritized higher than electrical network optimization);
- selecting the order which led to the highest (or lowest) value of a function of all scores of all plans.

Embodiment A9. A method according to any of the preceding embodiments wherein plural candidate routing plans are generated (e.g. by performing all or any subset of the operations of FIG. 15 for each of plural net arrangements).

Embodiment A10. A method according to any of the preceding embodiments wherein a GUI is provided which is configured for presenting said plural plans to a human designer end-user and which allows the end-user to rate said plural plans and/or to indicate a preference for one or some of said plural plans, over others.

Embodiment A11. A method according to any of the preceding embodiments wherein N candidates are presented to the end-user, by performing all or any subset of:

- select the next available net arrangement and initialize the graph weights and score to zero; maintain the best M routing plan candidates for the selected net; e.g. using a 2D routing algorithm, the best plans are derived, and their associated graph score is computed;
- after analyzing all possible nets, there are K×M candidate plans;
  - select N plans out of K×M plans e.g. by score or a preference learning method which may tweak the selection process based on historical preference choices.

Embodiment A12. A method according to any of the preceding embodiments wherein a learning preference method is used for routing design.

Embodiment A13. A method according to any of the preceding embodiments wherein said learning preference method includes all or any subset of the following operations:

- derive N routing plan candidates using all or any subset of the operations of FIG. 18; modify the selection of the candidates according to the learning process method; for each candidate, obtain its score and construct a classification vector using some predefined parameters to be extracted or computed from the candidate routing plan itself;
- some information based on the score or the classification vector is presented to the designer, in addition to the candidate routing plan, assisting with the selection process and allowing a human designer end-user to choose (select) one candidate;
- use the score and classification vector values of all candidates to create feedback for a preference learning method (e.g., re-enforcement) and wherein the feedback may include all or any subset of: selection label (selected, not selected), scores, vector values;
- feedback may include a vector function-based difference computation (e.g., Euclidean distance) between a rejected candidate and the selected candidate.

Embodiment A14. A method according to any of the preceding embodiments wherein the preference learning method may modify a weight vector matching the dimensions of the classification vector, emphasizing and de-emphasizing the impacts of various dimensions of the classification vector e.g. as per learned preference/s of designer/s.

Embodiment A15. A method according to any of the preceding embodiments wherein the preference learning method may be used for selecting top-N candidates for the next design process.

Other embodiments include:

Embodiment b-1. A method for deploying at least one physical connector within faces, including at least one of walls, ceilings and floors, of an architectural structure e.g. a building, wherein each physical connector interconnects physical locations along the faces of the architectural structure, the system comprising using a hardware processor for all or any subset of:

a. Displaying a representation of a 3d architectural structure typically including a polyhedron which has faces corresponding to at least one of a wall, a ceiling and a floor of the structure, wherein the polyhedron defines plural 2 dimensional nets aka polyhedral nets or net representations or net arrangements, and/or b. Accepting a human designer's selection of locations, on the faces of the polyhedron, at which to position physical resource nodes such as water outlets, electrical outlets, taps, sewer junctions, or, generally, intersections between physical connectors, wherein each node typically belongs to a physical resource network such as a water pipe network, electrical network or sewage network; and/or c. for each physical resource network within a set of physical resource networks which may include at least one of: a water pipe network, a sewage pipe network, an electrical cable network, to be deployed in the architectural structure:

- for each of the plural nets, generating a logical graph including
  - logical nodes which represent at least some of said physical resource nodes respectively; and
  - edges, which represent required physical connectors between said physical resource nodes, respectively and weights defined for each of the edges; and/or
- scoring each net's logical graph and, accordingly, selecting at least one best net from among the plural nets; and/or
- deploying at least one physical resource node, and at least one of water pipes, sewage pipes, and electrical cables in the architectural structure according to a routing plan which interconnects plural nodes belonging to said physical resource network and which is derived from the logical graph generated for the best net from among the plural nets.

Embodiment b-2. A method according to any of the preceding embodiments wherein nodes can only be interconnected by connectors or edges lying within edge-joined polyhedron faces.

Embodiment b-3. A method according to any of the preceding embodiments wherein at least two nets from among the plural nets differently define how pairs of first and second nodes, in first and second polyhedron faces, can be interconnected, because in one of the two nets, the first and second polyhedron faces are edge-joined and in another of the two nets, the first and second polyhedron faces are not edge-joined.

Embodiment b-4. A method according to any of the preceding embodiments wherein the architectural structure comprises a room.

Embodiment b-5. A method according to any of the preceding embodiments wherein the architectural structure comprises a common area coupling two rooms and wherein the method also comprises identifying the common area and pre-processing by identifying a mediation point in the common area and its location and connectivity requirements.

Embodiment b-6. A method according to any of the preceding embodiments wherein said generating and scoring is performed for each physical resource network within the set of networks, for a first ordering of the physical resource networks within the set of networks and is then performed again at least once, for each physical resource network within the set of networks, for at least one second ordering of the physical resource networks within the set of networks which differs from said first ordering, thereby to yield at least two best nets and wherein a selection is made between said at least two best nets thereby to define a most preferred net and then, at least one physical resource node, and at least one of water pipes, sewage pipes, and electrical cables in the architectural structure, are deployed according to the logical graph generated for the most preferred net.

Example: it is desired to route an electrical network and a water supply network in a structure. Methods herein are applied first for the electrical network which yields a routing plan E1 which uses a Net X1 and then subsequently to the water supply network which yields a routing plan aka network plan W1 which uses Net Y1; net X1 may or may not differ from Net Y1. At this stage it is possible to determine how much does it cost to build E1 and how much to build W1. Next, the order is changed; methods herein are now applied first on the water network, yielding routing plan W2 which uses Net Y2 and then, subsequently, on the electrical network yielding routing plan E2 which uses Net X2; it is appreciated that it is not necessarily true that W1=W2 and not necessarily true that E1=E2 E.g. if the design of one network interferes or imposes limitations on the other network (e.g. designing the water network first may limit the design of the electrical network, and fice versa. Also, nets X1 and Y1 are not necessarily the same e.g. because the outlets (nodes) of one network may differ, in number and/or in location. The system may then use any suitable criterion for bestness to select an order (in which order to apply methods herein to the various network) which delivers a best "cost" (optimization) using the scores. this example includes 2 different resources (electrical/water) thus there are 4 possible outcomes—either E1,W1 were cheapest to build, or, E1, W2 were cheapest to build, or E2, W1 were cheapest to build, or E2, W2 were cheapest to build. bestness criteria may be determined by, say, deciding to prioritize electrical thus no matter how much it costs to build the water network, the order which delivered the lowest cost option for the electrical network will be selected. Or, another bestness criterion may favor the sum of costs over the 2 (or plural) networks. analyzing all or several different orderings of the networks, in terms of which is subjected to the methods herein first, and which only later, enables the system to discover more (e.g. all possible) options for optimizing routing.

Embodiment b-7. A method according to any of the preceding embodiments wherein plural routing plans are generated by at least one routing algorithm and wherein, in at least one initial mode of operation, the method prompts a user to rate at least some of the plural routing plans thereby to generate user ratings.

Embodiment b-8. A system for deploying at least one physical connector within faces, including at least one of walls, ceilings and floors, of an architectural structure e.g. a building, wherein each physical connector interconnects physical locations along the faces of the architectural structure, the system comprising at least one hardware processor configured to carry out:

a. Displaying a representation of a 3d architectural structure including a polyhedron which has faces corresponding to at least one of a wall, a ceiling and a floor of the structure, wherein the polyhedron defines plural 2 dimensional nets aka polyhedral nets or net representations or net arrangements,
b. Accepting a human designer's selection of locations, on the faces of the polyhedron, at which to position physical resource nodes, and other intersections between physical connectors, wherein each node belongs to a physical resource network; and
c. for each physical resource network within a set of physical resource networks, to be deployed in the architectural structure:

for each of the plural nets, generating a logical graph including logical nodes which represent at least some of said physical resource nodes respectively; and edges, which represent required physical connectors between said physical resource nodes, respectively and weights defined for each of the edges;

scoring each net's logical graph and, accordingly, selecting at least one best net from among the plural nets, thereby to facilitate deploying at least one physical resource node, and at least one physical connector in the architectural structure according to a routing plan which interconnects plural nodes belonging to said physical resource network and which is derived from the logical graph generated for the best net from among the plural nets.

Embodiment b-9. A computer program product, comprising a non-transitory tangible computer readable medium having computer readable program code embodied therein, said computer readable program code adapted to be executed to implement a method for method for deploying at least one physical connector within faces, including at least one of walls, ceilings and floors, of an architectural structure e.g. a building, wherein each physical connector interconnects physical locations along the faces of the architectural structure, the system comprising using a hardware processor for:

a. Displaying a representation of a 3d architectural structure including a polyhedron which has faces corresponding to at least one of a wall, a ceiling and a floor of the structure, wherein the polyhedron defines plural 2 dimensional nets aka polyhedral nets or net representations or net arrangements,
b. Accepting a human designer's selection of locations, on the faces of the polyhedron, at which to position physical resource nodes such as water outlets, electrical outlets, taps, sewer junctions, or intersections between physical connectors, wherein each node belongs to a physical resource network such as a water pipe network, electrical network or sewage network; and
c. for each physical resource network within a set of physical resource networks which may include at least one of: a water pipe network, a sewage pipe network, an electrical cable network, to be deployed in the architectural structure:

for each of the plural nets, generating a logical graph including logical nodes which represent at least some of said physical resource nodes respectively; and edges, which represent required physical connectors between said physical resource nodes, respectively and weights defined for each of the edges;

scoring each net's logical graph and, accordingly, selecting at least one best net from among the plural nets, thereby to facilitate deploying at least one physical resource node, and at least one of water pipes, sewage pipes, and electrical cables in the architectural structure according to a routing plan which interconnects plural nodes belonging to said physical resource network and which is derived from the logical graph generated for the best net from among the plural nets.

Embodiment b-10. A system according to any of the preceding embodiments and wherein said physical connectors include at least one of: water pipes, sewage pipes, communication cables, optical fibers, and electrical cables.

Embodiment b-11. A system according to any of the preceding embodiments and wherein a single logical graph, but for weights, is used for most of said plural nets.

Embodiment b-12. A system according to any of the preceding embodiments and wherein a single logical graph, but for weights, is used for all of said plural nets.

Embodiment b-13. A method according to any of the preceding embodiments wherein said User ratings are used as labels in a supervised learning process.

Embodiment b-14. A method according to any of the preceding embodiments wherein after said supervised learning process has been repeated N times, the method generates its own system ratings for at least some routing plans, based on said supervised learning process, and compares said system ratings with said user ratings.

Embodiment b-15. A method according to any of the preceding embodiments wherein the method at least once presents plans to the human designer in order of the plans' system ratings thereby to increase likelihood of early presentation of a routing plan, to the human designer, which the human designer is likely to accept.

Embodiment b-16. A method according to any of the preceding embodiments wherein the method at least one pre-selects, in advance, plans which are more likely to be selected by the user thereby to bias optimization.

Embodiment b-17. A system according to any of the preceding embodiments wherein the system has a first mode, Mode [i], in which users are prompted to select better plans and/or rank or mark plans thereby to define user preferences, and machine learning of said user preferences occurs without machine-modification of presented plans.

Embodiment b-18. A system according to any of the preceding embodiments wherein the system has an additional mode, Mode [ii], in which the system guesses user preferences and accordingly, assesses its own accuracy and wherein said machine learning continues without machine-modification of presented plans.

Embodiment b-19. A system according to any of the preceding embodiments wherein the system has an additional mode, Mode [iii], in which the system takes into account historical preferences by presenting plans to the user which comprise an optimized derivation and/or which are presented in an order biased by a likelihood that each plan will be chosen by the user and wherein the system transitions from mode ii to mode iii when said accuracy achieves a given accuracy threshold.

Embodiment b-20. A system according to any of the preceding embodiments wherein the system has an additional mode, Mode [iii], in which the system takes into account historical preferences by presenting plans to the user which comprise an optimized derivation and/or which are presented in an order biased by a likelihood that each plan will be chosen by the user.

Embodiment b-21. A system according to any of the preceding embodiments wherein in mode iii, the user continues to rank and/or mark and/or select and the machine continues to learn.

Embodiment b-22. A method according to any of the preceding embodiments and wherein the method uses artificial intelligence to learn, over time, from the user, which routing plans are considered better and worse and wherein in at least one later mode of operation, the method automatically hence without resorting to a human user, selects at least one routing plan which is better over at least one routing plan which is worse, and at least one physical resource node, and at least one of water pipes, sewage pipes, and electrical cables in the architectural structure are then deployed according to a routing plan selected by the method as better rather than according to a routing plan selected by the method as worse.

The representation of the 3d architectural structure may comprise 3D visuals and/or a set of 2D visuals which, taken together, represent the 3D object.

It is appreciated that prompting a user to select a plan (or even plural best candidate plans) is a form of rating. For example, if one plan (plan J) is selected over plural remaining plans, a rank vector may be defined as [0 0 . . . 0 1 0 . . . 0 0] meaning that the vector is all zero besides position J, corresponding to the selected plan, which is set to 1.

According to some embodiments, the logical graph structure remains the same over all nets. For example, the graphs for all nets may have the same edges and nodes, however, the weights may differ from one graph to another, depending on the net.

This yields efficiency from a software perspective since a single structure may be used and re-used (e.g. no need to reconstruct a new matrix/data record), modifying only its weights.

According to some embodiments, the logical graph structure is the same for all possible routing plans for a resource network (and for the physical resource network's pre-allocated nodes). The weights may change as each possible routing plan is taken up; the system may compute the routing plan's score (e.g. optimization criteria) and select routing plans which scored high, or the routing plan which scored highest.

It is appreciated that the plural routing plans may be generated using the same routing algorithm or, different routing plans may be generated using different routing algorithms.

According to certain embodiments there is a learning process which after some time performs selections without human intervention. According to other embodiments, all or any subset of the following modes may be provided:

[A] User selects better plans and ranks/marks those accordingly

[B] Machine learns about user preferences. No modifications to the presented plans are done.

[C] At a later stage, Machine guesses user preferences just for assessing its own accuracy. Selection/Ranking/Learning continues as no modifications to the presented plans are done.

[D] At a later stage the Machine takes into account historical preferences by presenting plans to the user which are the optimized derviation biased by the likelihood that they will be chosen by the user. User continues to rank/mark/select. Machine continues to learn.

According to other embodiments, all or any subset of the following modes may be provided; typically mode i is available initially, and modes ii and iii become available only later.

Mode [i] User selects better plans and ranks/marks those accordingly. Optionally, Machine learns about user preferences but does not modify the presented plans.

Mode [ii] At a later stage, Machine guesses user preferences just for assessing its own accuracy. Selection/Ranking/Learning continues and typically, presented plans are not modified.

Mode [iii] At a later stage the Machine takes into account historical preferences by presenting plans to the user which may comprise an optimized derivation biased by the likelihood that the plans will be chosen by the user. User continues to rank/mark/select; machine continues to learn.

According to one embodiment, routing plans presented in mode iii are based on optimization only but the order in which the plans are presented to the user comprise a likelihood-biased optimized derivation in the sense that they are based on the likelihood they will be chosen e.g. routing plans which the machine deems more likely to be selected by the user are presented to the user before routing plans which the machine deems less likely to be selected by the user. According to another embodiment, routing plans presented in mode iii comprise a likelihood-biased optimized derivation in the sense that they are based on an optimization process that takes user selection bias into account in advance.

According to yet another embodiment, only one plan is presented which is a machine guess ed "best" plan, e.g. a plan most likely to be chosen. Thus in this embodiment, the number of plans presented to the user decrease, as the system progresses with its understanding of what is best and preferred.

The following terms may be construed either in accordance with any definition thereof appearing in the prior art literature or in accordance with the specification, or to include in their respective scopes, the following:

- Resource—is intended to include any supply of materials or services such as water, electricity etc.
- Points (or nodes)—is intended to include any service area or location on a network at which resources are accessed or interfaced with, or an intersection point between physical connectors (such as but not limited to cables or pipes or channels or optical fibers) along which resources such as but not limited to electricity, water, and sewage, may flow.
- Routing—is intended to include any method of finding paths from different points in a given network.
- Path—is intended to include any track connecting between at least 2 points (or nodes).
- Prism—is intended to include any solid geometric figure whose two end faces are similar, equal, and parallel rectilinear figures, and whose sides are parallelograms. Throughout the document this typically refers to a rectangular prism which has six faces that are rectangles (a box, a room).
- Graph—is intended to include any structure which may include a set of objects in which some pairs of the objects may be in some sense "related". The objects correspond to nodes, and typically a graph is depicted in diagrammatic form as a set of dots or circles for the vertices or nodes, joined by lines or curves for the edges or physical connectors.
- Logical Graph—is intended to include any graph which describes a physical network in an abstract way utilizing only some connectivity aspects (e.g., A is connected to B yet the physical method used to connect A and B and other related characteristics may be ignored).
- Net—typically comprises a two-dimensional figure, typically comprising plural rectangles respectively representing a room's walls, ceiling and floor, that can be folded into a three-dimensional object (room).
- Routing plan—may include a set of paths/edges/pipes/cables extending, within the faces of a prism or polyhedron or other geometrical figure, between certain nodes deployed within the faces of the prism.

Problems solved by embodiments herein may include all or any subset of:

In automation of resource and utility routing, one complication is that buildings have multiple walls and floors. Current routing guidelines, procedures and methods are focused on a 2D (two dimensional) confined area in which the routing process takes place and therefore significantly limits the capability to take into account multiple factors which exist in building design, such as but not limited to all or any subset of the following:

- The building is 3D (three dimensional), not only the wall which has some depth, but its relative and absolute position within the building space
- There is more than one wall
- Some walls are shared between different rooms
- There is some inherent hierarchy within the building which may need to be taken into account (e.g., multiple floors, multiple apartments or offices, multiple rooms)

Each resource or utility may impose different design restrictions or guidelines, either due to regulations or specific practices.

Certain embodiments provide automation of resource and utility routing in the case of buildings which include plural walls and floors.

Certain embodiments are configured for operating beyond the current routing guidelines, procedures and methods which handle confined 2D areas.

Certain embodiments take into account the routing process that may be required even in the case of the multiple aspects in building design such as but not limited to all or any subset of the following:

- Handling the 3D characteristics of the building
- Handling the reality in which walls are not "isolated" islands and may be connected or shared between different rooms and building sections (e.g., apartments)
- Acknowledge the building's inherent hierarchy—multiple units, multiple floors etc.
- Take into account the specific routing restrictions or recommendations of each resource
- Optimize the complete routing process according to some predefined criteria.

Embodiments herein may be useful for end-users such as but not limited to architects, building contractors, and construction companies.

Currently, building design may require extended times to complete and/or is prone to errors or non-optimal e.g. due to manual and tedious labor involved. Even if, at certain junctures in the design process, limited automation is applied for certain assignments, as with the case of a single standalone wall, complete end-to-end optimization is not achieved e.g. due to inferior design choices which may favor pointwise (or localized) compromises or paybacks.

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations, and, instead, the remote processor P itself may receive output/s of portion/s of the operation from yet another processor/s P', may be deployed off-shore relative to P, or "on a cloud", and so forth.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with all or any subset of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as flash drives, optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules illustrated and described herein may include any one or combination or plurality of: a server, a data processor, a memory/computer storage, a communication interface (wireless (e.g. BLE) or wired (e.g. USB)), a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program, such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing systems, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

Any feature or logic or functionality described herein may be implemented by processor/s or controller/s configured as per the described feature or logic or functionality, even if the processor/s or controller/s are not specifically illustrated for simplicity. The controller or processor may be implemented in hardware, e.g., using one or more Application-Specific Integrated Circuits (ASICs) or Field-Programmable Gate Arrays (FPGAs), or may comprise a microprocessor that runs suitable software, or a combination of hardware and software elements.

The present invention may be described, merely for clarity, in terms of terminology specific to, or references to, particular programming languages, operating systems, browsers, system versions, individual products, protocols, and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components, and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein.

Any suitable processor/s may be employed to compute or generate or route, or otherwise manipulate or process information as described herein and/or to perform functionalities described herein and/or to implement any engine, interface or other system illustrated or described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

The system shown and described herein may include user interface/s e.g. as described herein which may for example include all or any subset of: an interactive voice response interface, automated response tool, speech-to-text transcription system, automated digital or electronic interface having interactive visual components, web portal, visual interface loaded as web page/s or screen/s from server/s via communication network/s to a web browser or other application downloaded onto a user's device, automated speech-to-text conversion tool, including a front-end interface portion thereof and back-end logic interacting therewith. Thus the term user interface or "UI" as used herein includes also the underlying logic which controls the data presented to the user e.g. by the system display, and receives and processes and/or provides to other modules herein, data entered by a user e.g. using her or his workstation/device.

BRIEF DESCRIPTION OF THE DRAWINGS

Certain embodiments of the present invention are illustrated in the following drawings; in the block diagrams, arrows between modules may be implemented as APIs, and any suitable technology may be used for interconnecting functional components or modules illustrated herein in a suitable sequence or order e.g. via a suitable API/Interface. For example, state of the art tools may be employed, such as but not limited to Apache Thrift and Avro which provide remote call support. Or, a standard communication protocol may be employed, such as but not limited to HTTP or MQTT, and may be combined with a standard data format, such as but not limited to JSON or XML.

Example embodiments are illustrated in the various drawings. Specifically.

There may be a specific net (the spread of the prism faces) for demonstrating the connections in 2D.

Figure 1:
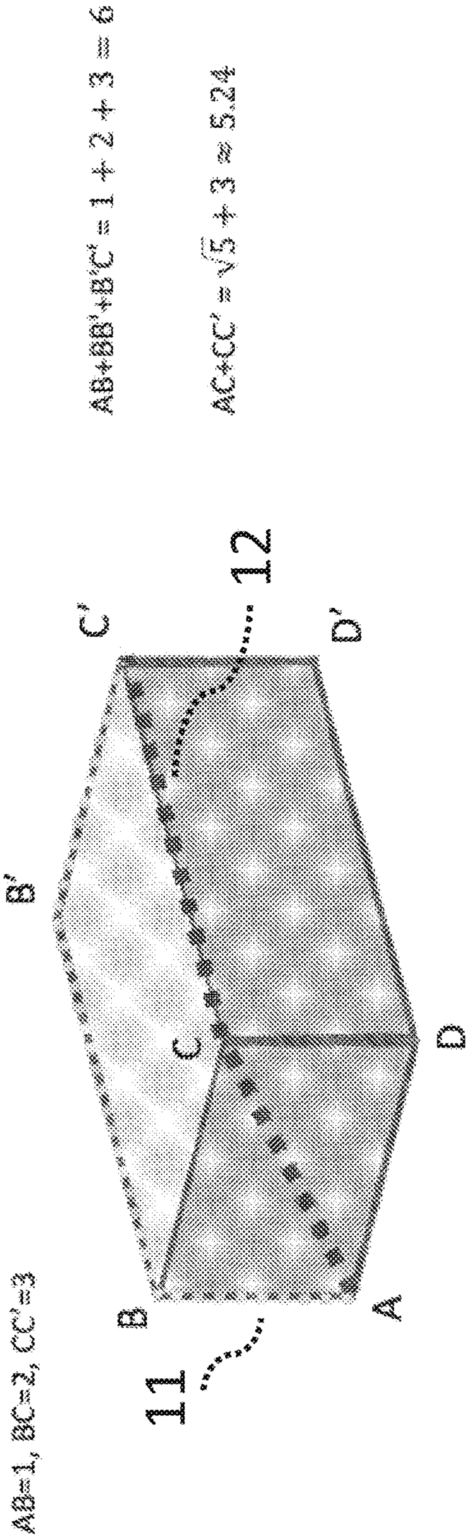
FIG. 1 is a simplified diagram of a 3D example of a suboptimal choice for connecting 2 points on a rectangular prism (assuming a minimum length criteria goal).

In FIG. 1:

$$AB=1, BC=2, CC'=3$$

$$AB+BB'+B'C'=1+2+3=6$$

$$AC+CC'=\sqrt{5}+3\approx 5.24$$

Figure 2:
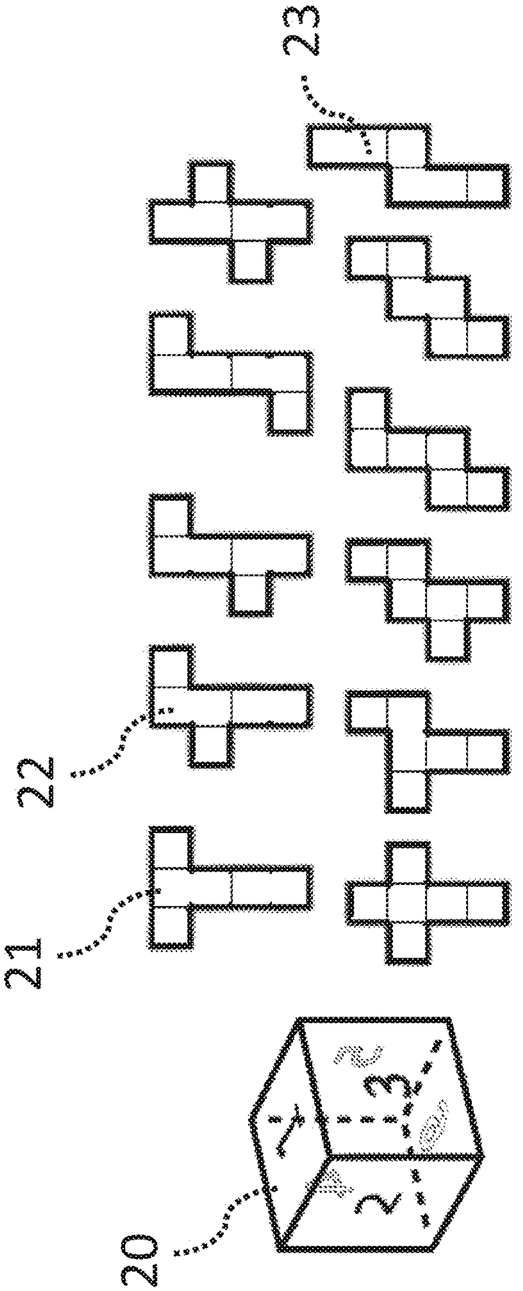

FIG. 2 is a simplified diagram of eleven possible nets of a cube.

Figure 3A:
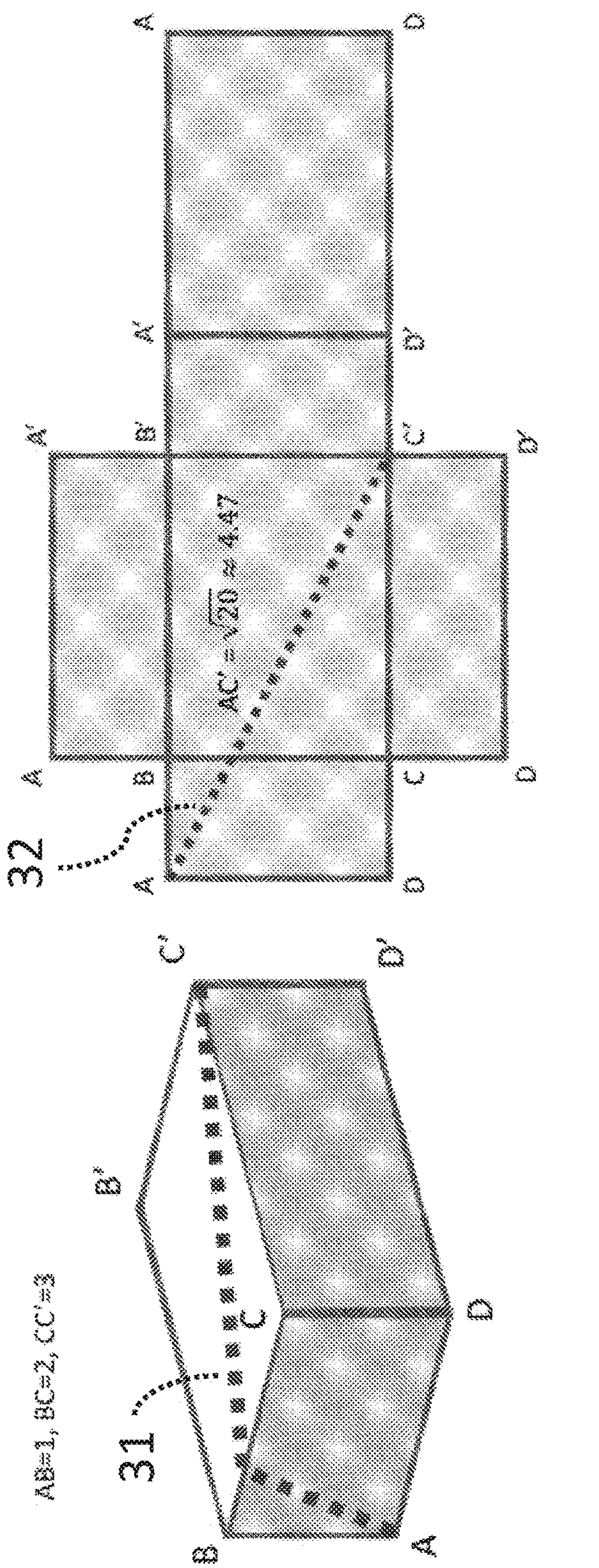

FIG. 3*a* is a simplified diagram of a similar case to FIG. 1 with the shortest (optimal) connection path presented using the corresponding net.

In FIG. 3*a:*

$$AB=1, BC=2, CC'=3$$

$$AC'=\sqrt{20}\approx 4.47$$

FIG. 3*b* is a simplified diagram of a different net which provides a different optimal path candidate for the given net, but is longer than the one achievable by the net in 3*a.*

In FIG. 3*b:*

$$AB=1, BC=2, CC'=3$$

$$AC'=\sqrt{1+25}\approx 5.1$$

Figure 4:
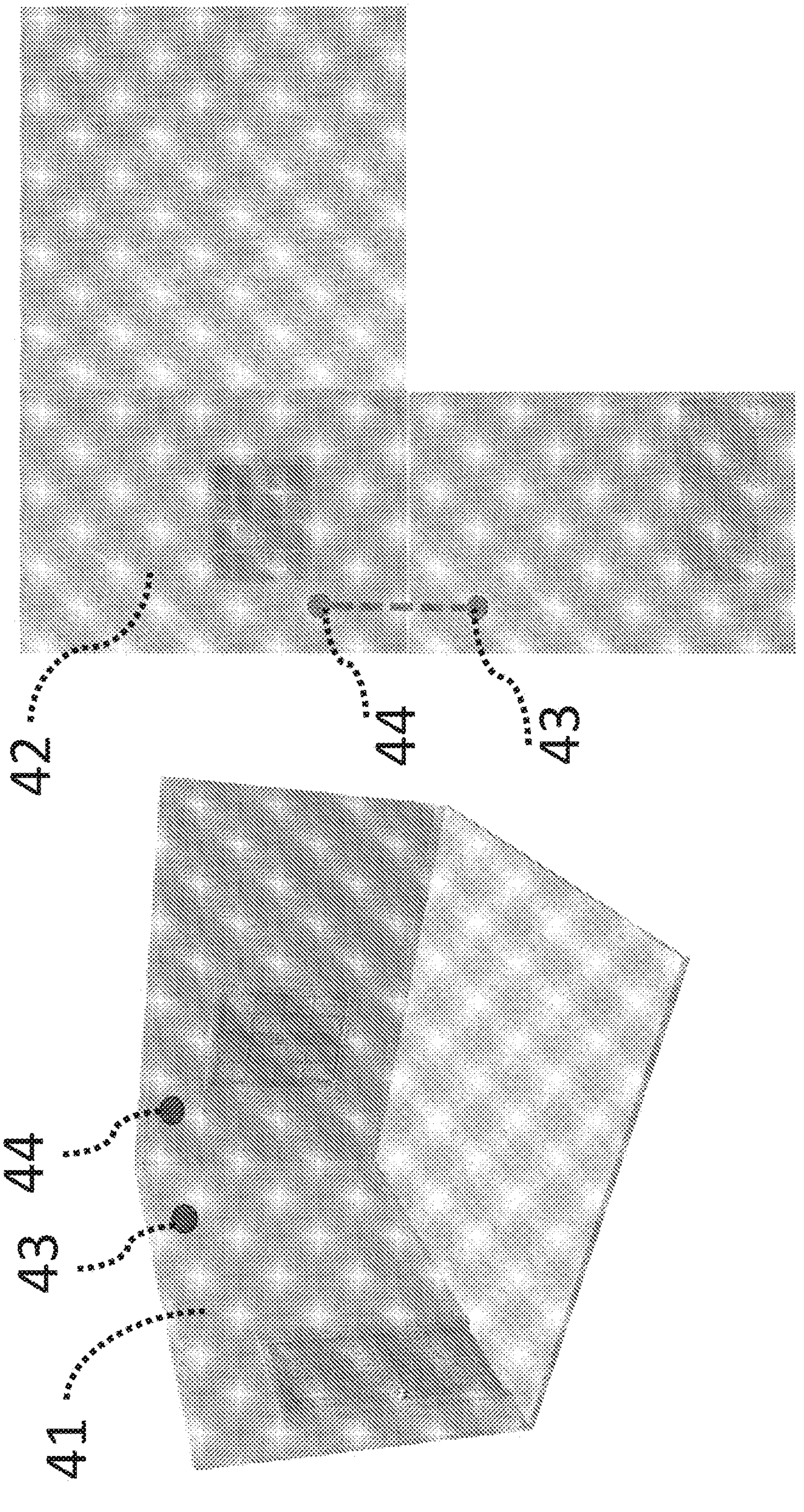

FIG. 4 is a simplified diagram of a room corner example with 2 points (elements) each on adjacent walls. A possible net arrangement is shown as well with a routing candidate plan.

Figure 5:
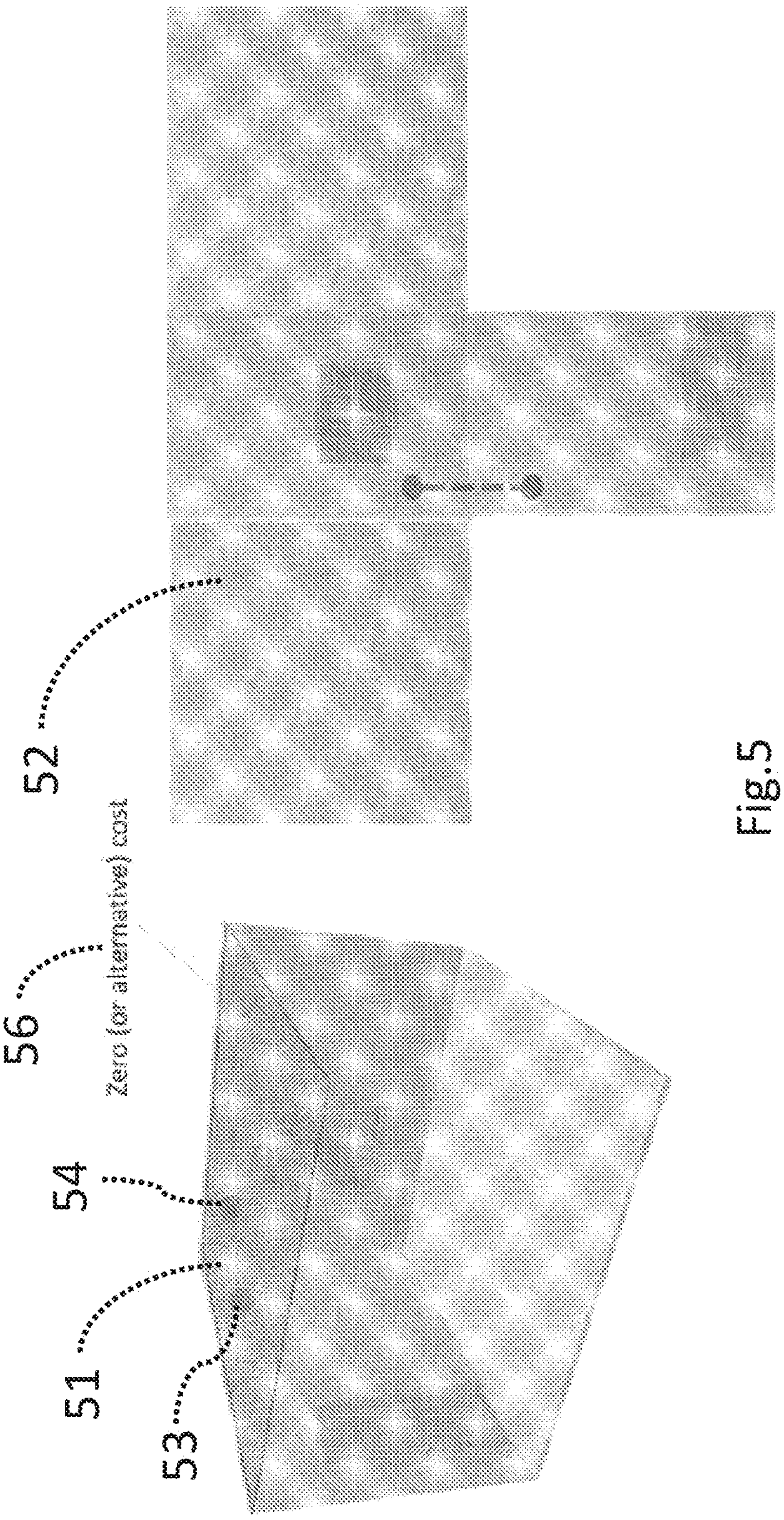

FIG. 5 is a simplified diagram, similar to FIG. 4, of the same corner room with a ceiling, in which there is a zero-cost associated with "going through" the ceiling as shown at reference numeral 56. The specific net arrangement shown does not exploit this benefit.

Figure 6:
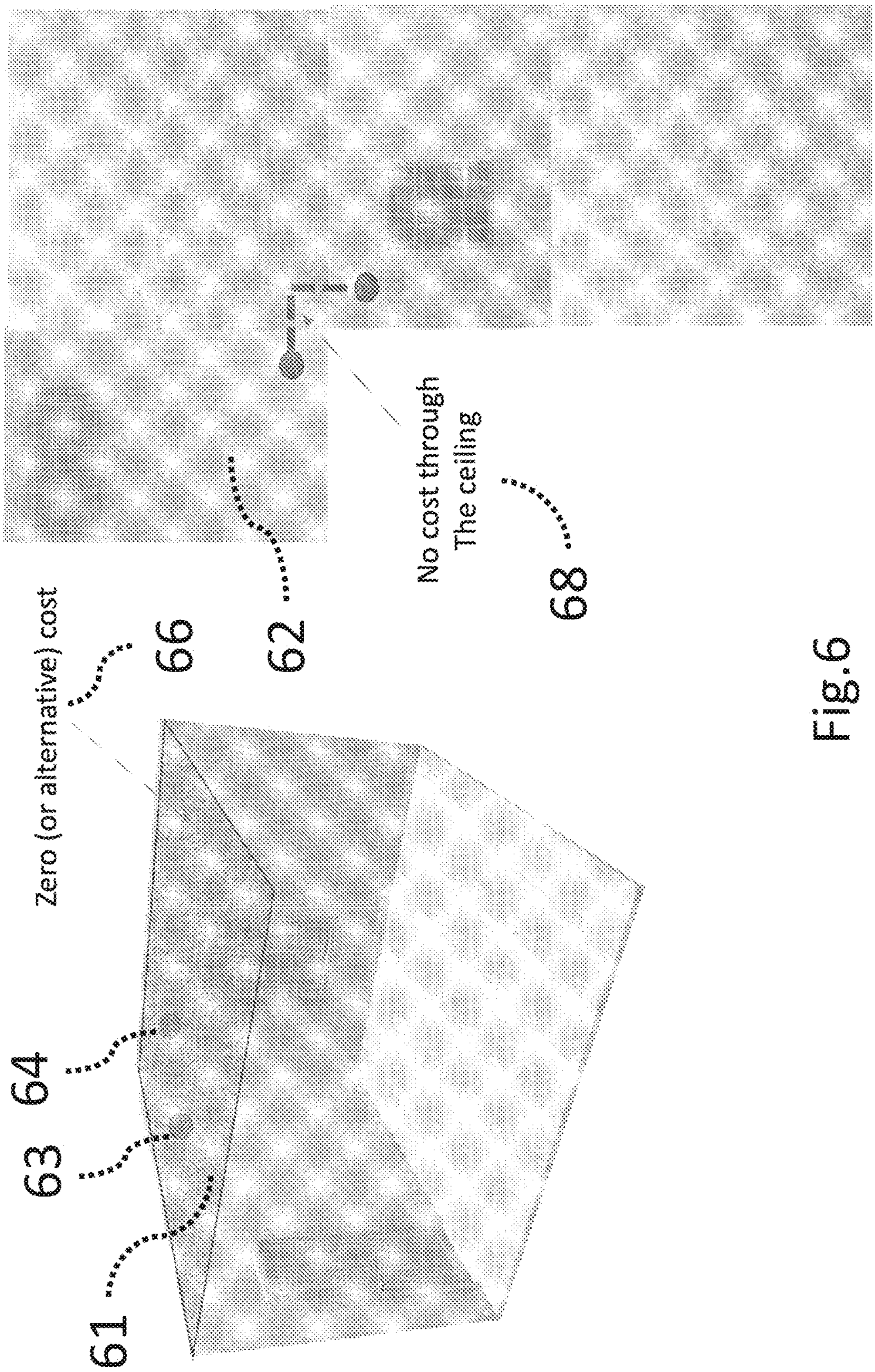

FIG. 6 is a simplified diagram of, similar to FIG. 5, a different net arrangement, which facilitates a better routing plan by using the ceiling. As shown, there is zero (or alternative) cost at reference numeral 66 and no cost through the ceiling e.g. as shown at reference numeral 68.

Figure 7A:
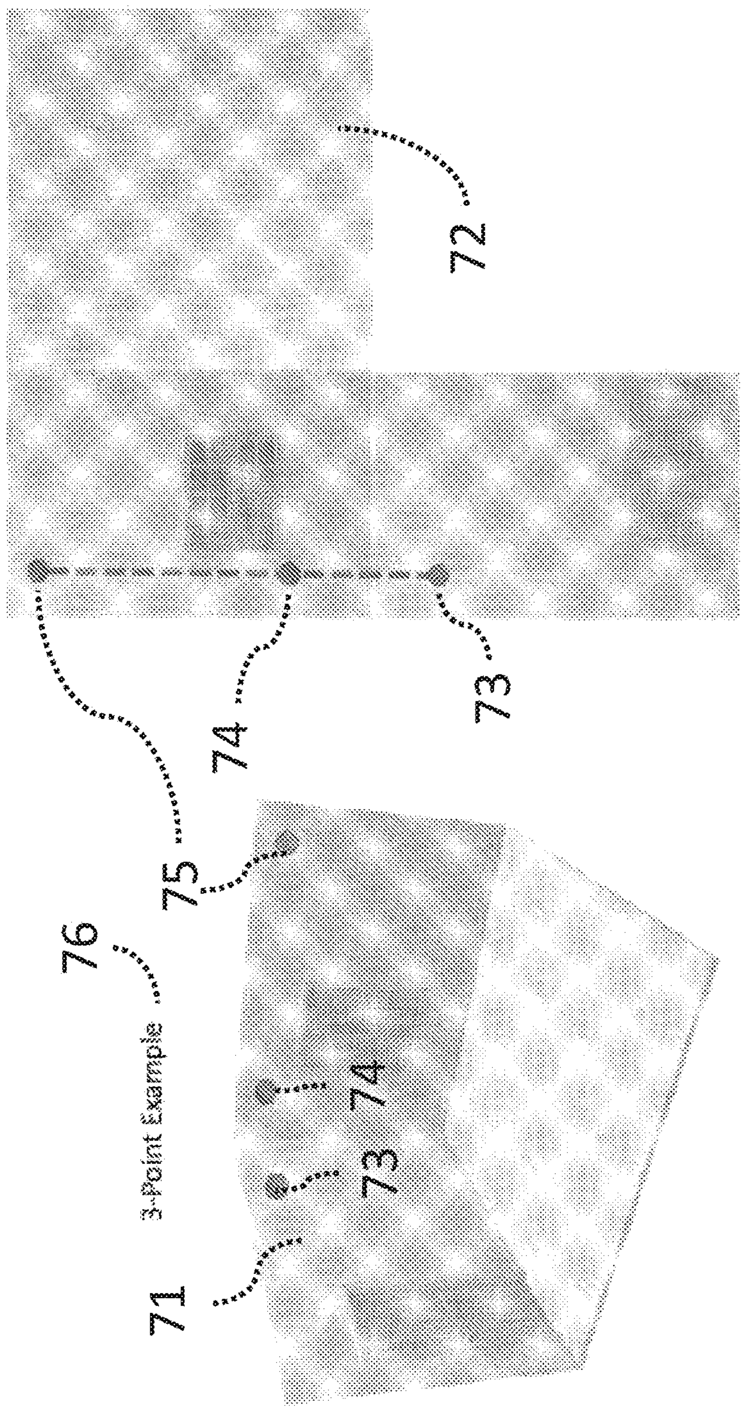

FIG. 7*a* is a simplified diagram of a 3-point example including, continuing the example of FIG. 4, three elements to be connected with no ceiling. As shown, there is zero (or alternative) cost at reference numeral 80 and no cost for the ceiling e.g. as shown at reference numeral 82.

Figure 7B:
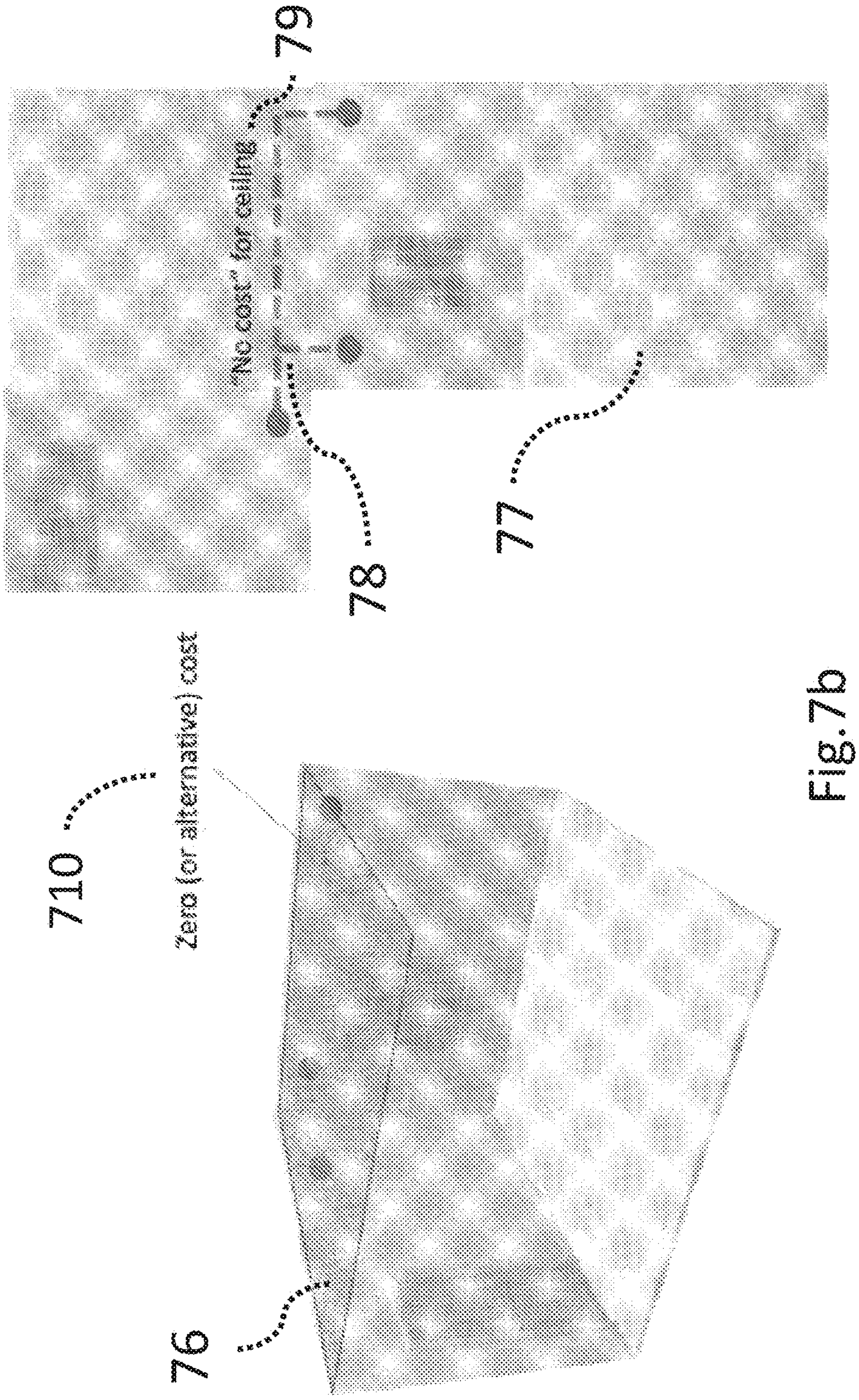

FIG. 7*b* is a simplified diagram, continuing the example of FIG. 4, three elements to be connected, with ceiling and a zero-cost benefit exploited by the net.

Figure 8:
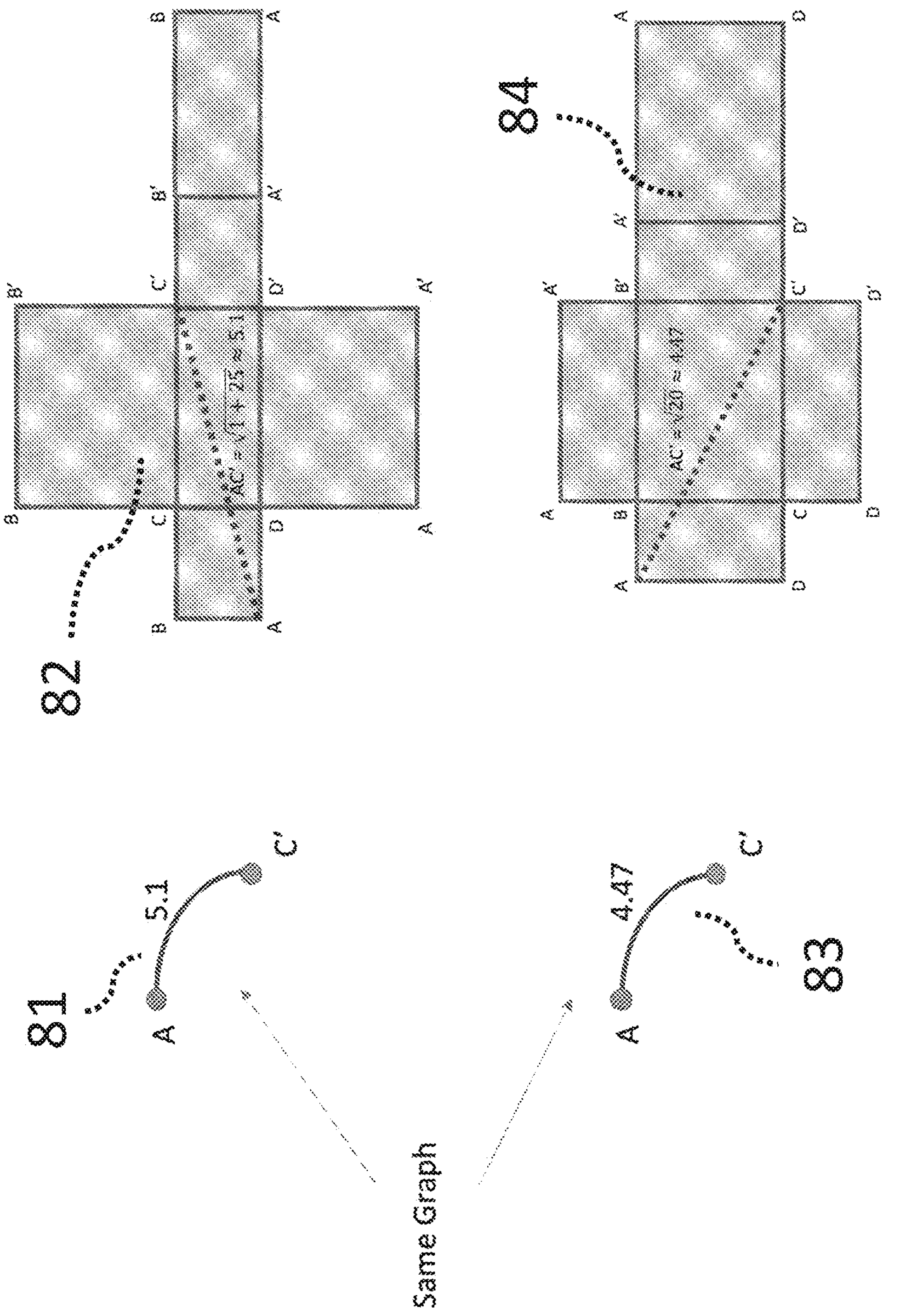

FIG. 8 is a simplified diagram of a logical graph which remains invariant no matter what net arrangement is chosen; thus the graphs of reference numerals 81 and 83 are the same but for the difference in weights. An example of a 2-point graph is given.

In FIG. 8:

$$AC'=\sqrt{20}\approx 4.47$$

$$AC'=\sqrt{1+25}\approx 5.1$$

Figure 9B:
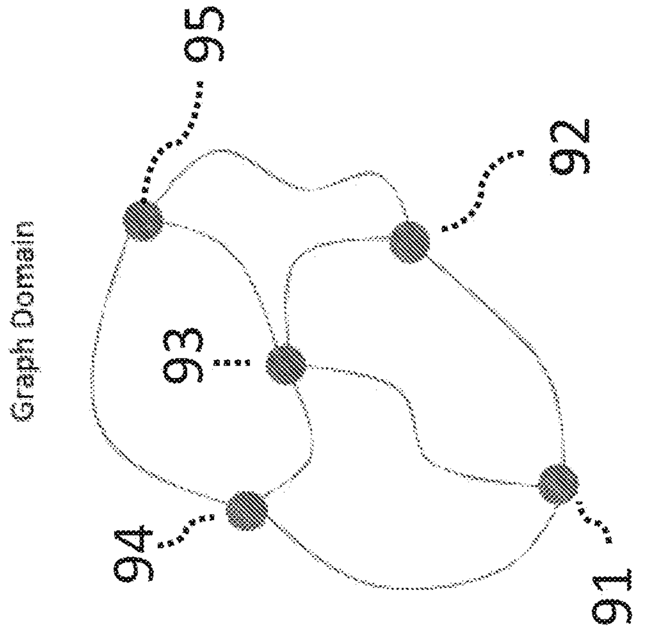
Figure 9A:
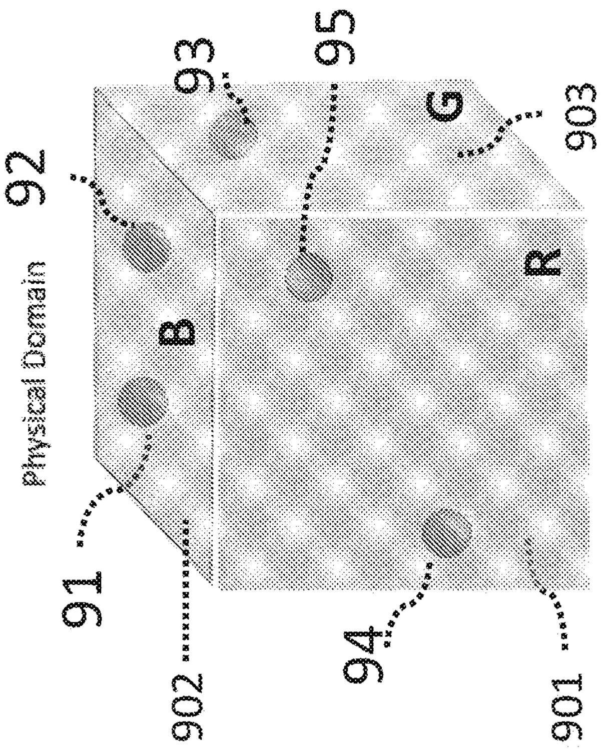

FIGS. 9*a* and 9*b* illustrate a graph and corresponding physical structure represented as a polyhedron, in terms of connectivity.

Figure 10A:
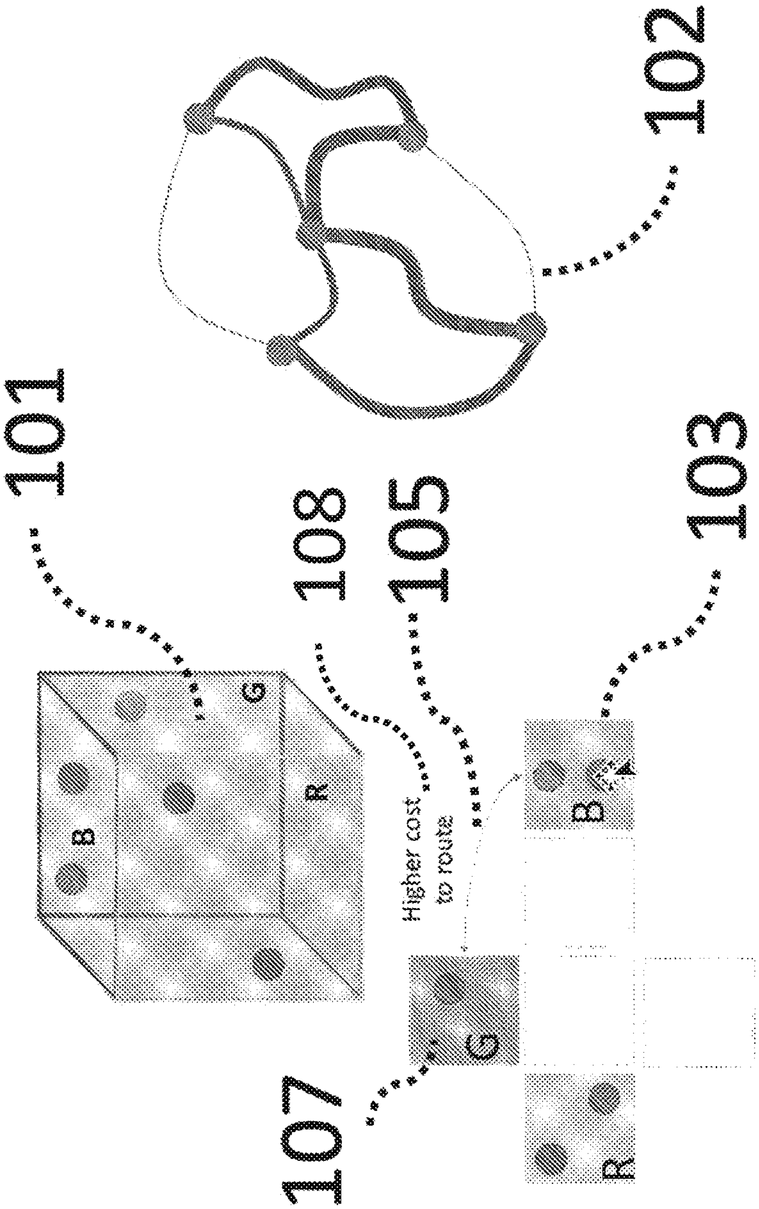
Figure 10B:
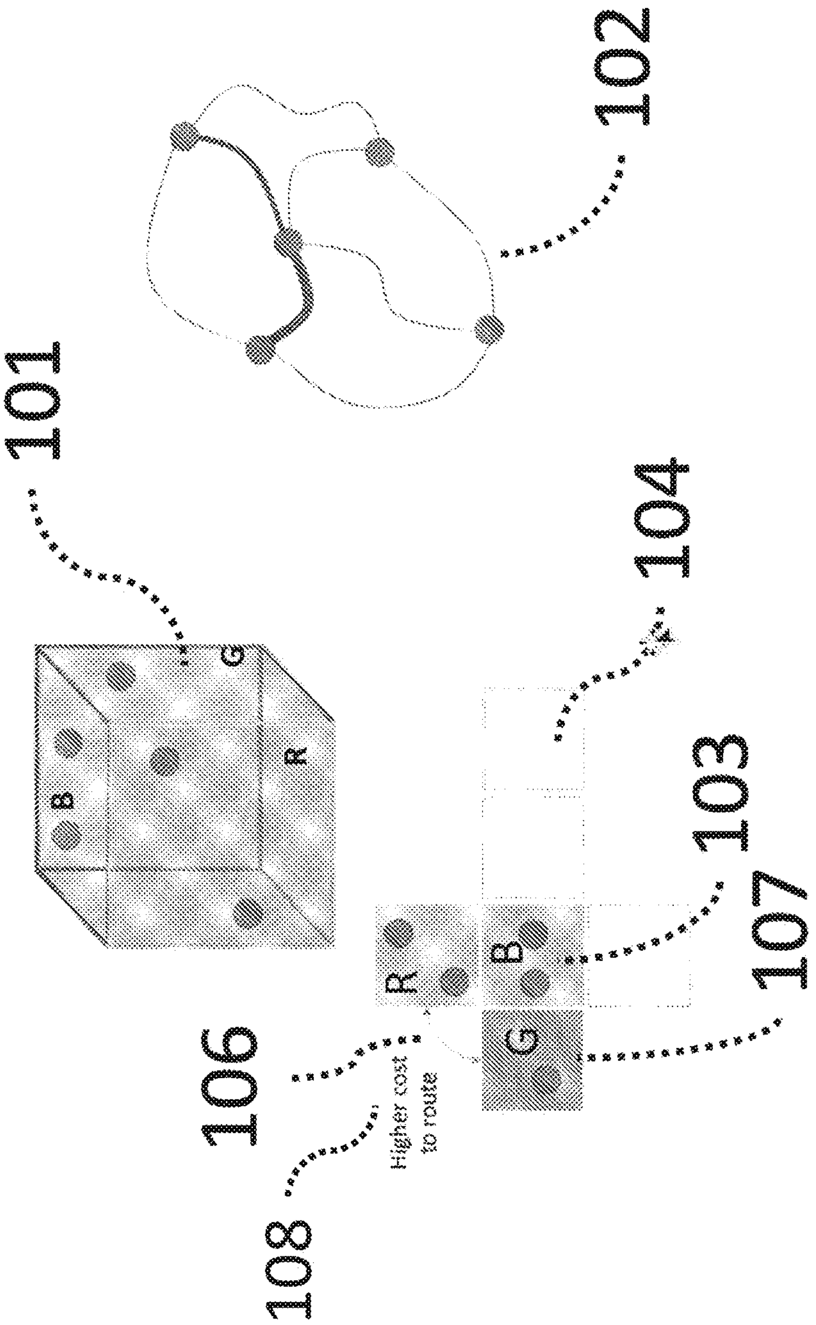

FIGS. 10*a*, 10*b* are simplified diagrams comparing different net arrangements and their impact on routing complexity. The higher cost to route is shown by arrow 105 in FIG. 10*a* and by arrow 106 in FIG. 10*b*. As shown there is higher cost to the route e.g. as shown at reference numeral 108 in FIGS. 10*a* and 10*b*.

Figure 11:
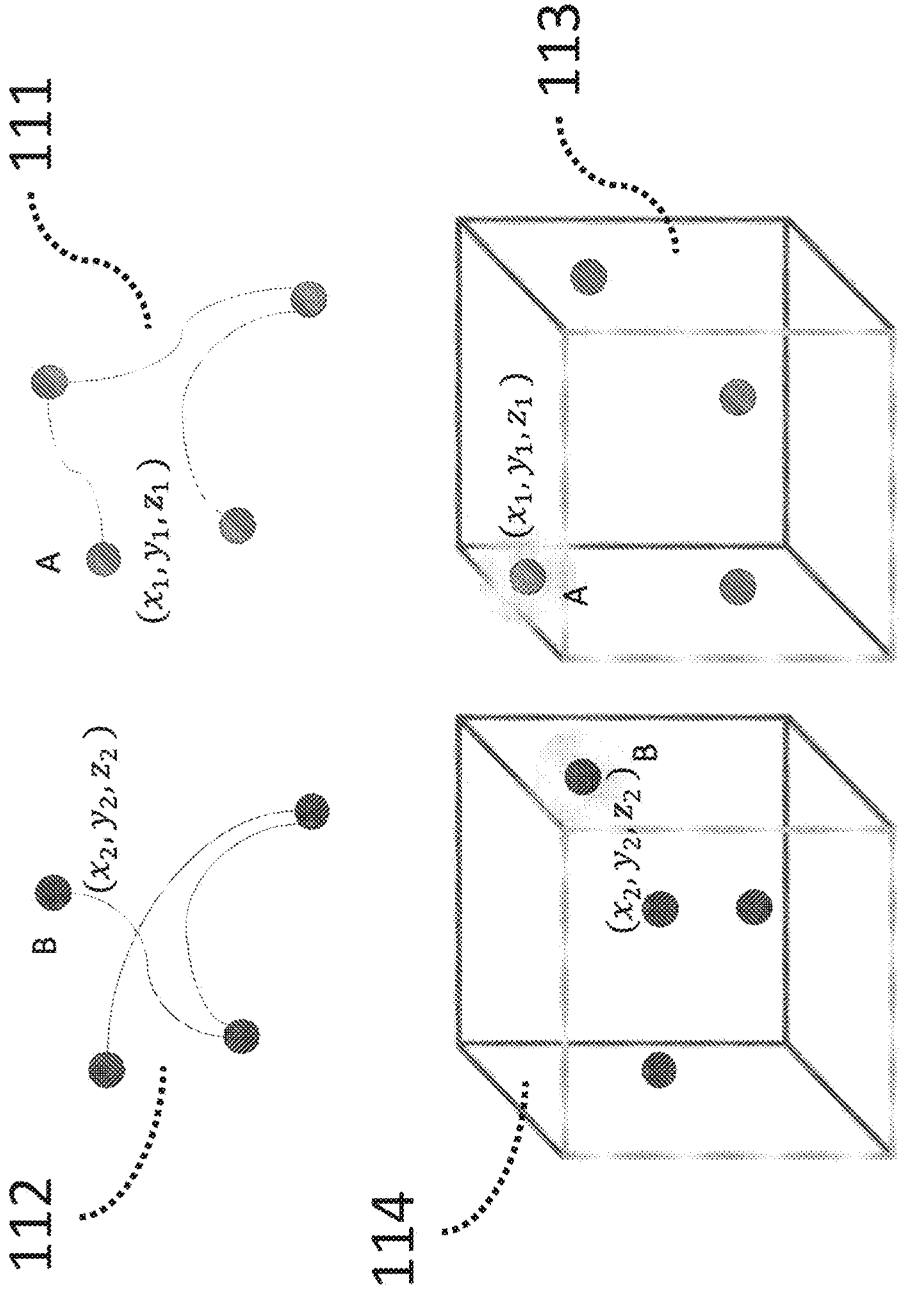

FIG. 11 is a simplified diagram of adjacent rooms with coupling potential between points which may impact routing plans. In FIG. 11, nodes A, B are at the following coordinates respectively: $(x_1, y_1, z_1)$ and $(x_2, y_2, z_2)$.

Figure 12:
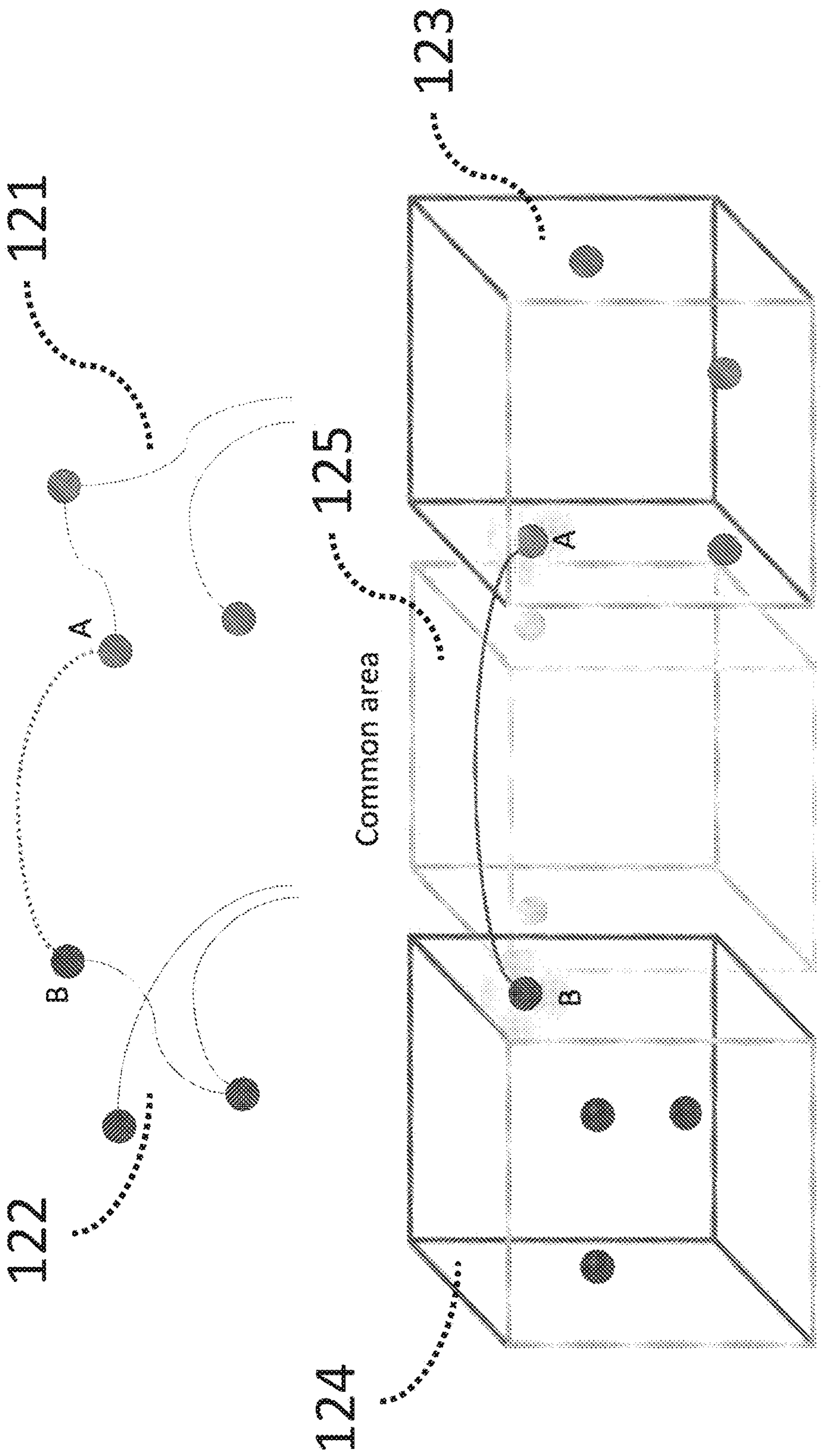
Figure 13B:
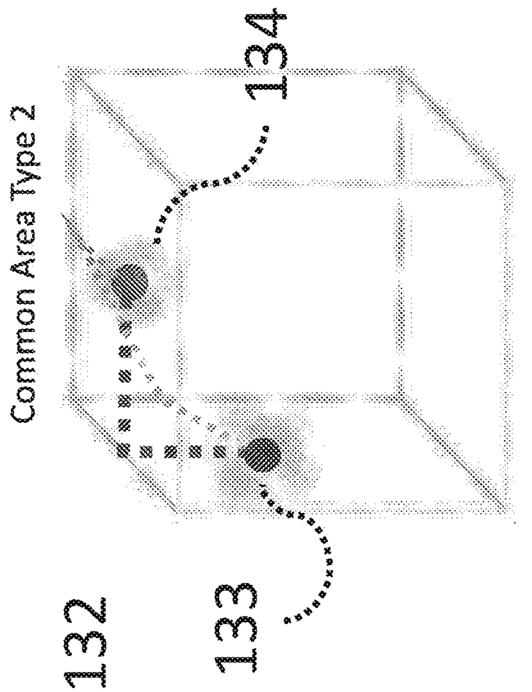
Figure 13A:
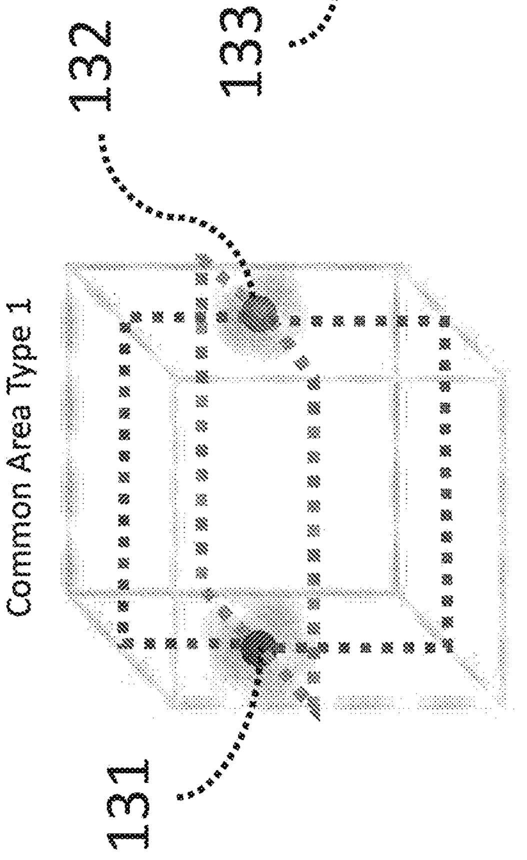
Figure 13D:
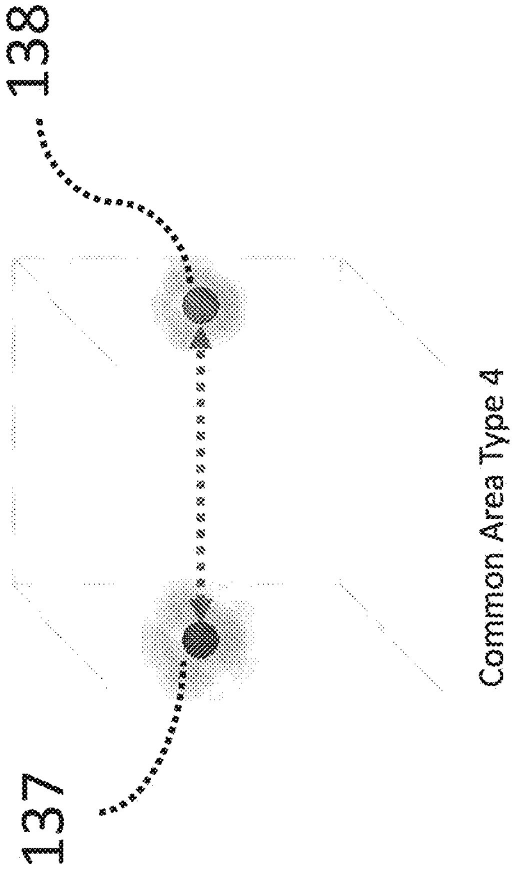
Figure 13C:
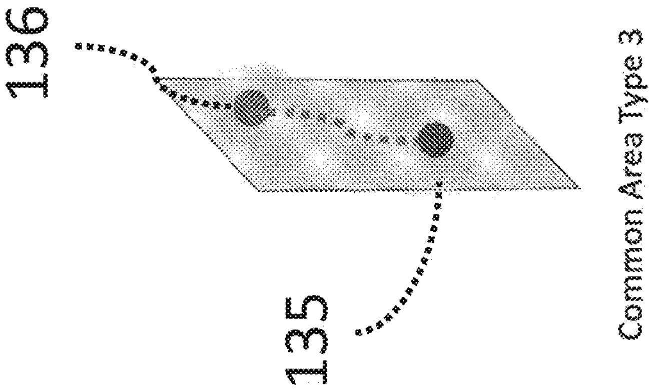

FIG. 12 is a simplified diagram of a common area 125 through which the coupling of different points from different rooms is taken care of.

FIGS. 13*a*-13*d* are simplified diagrams of example common area types 1-4 respectively.

Figure 14A:
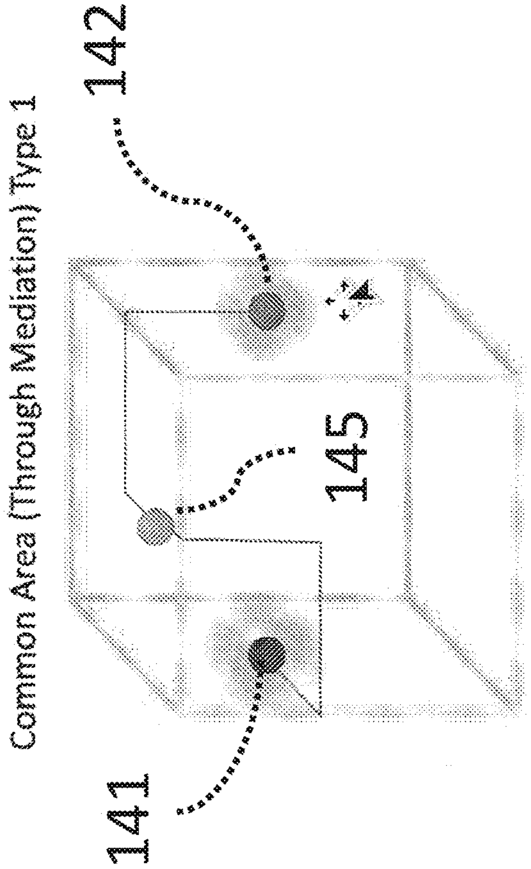
Figure 14B:
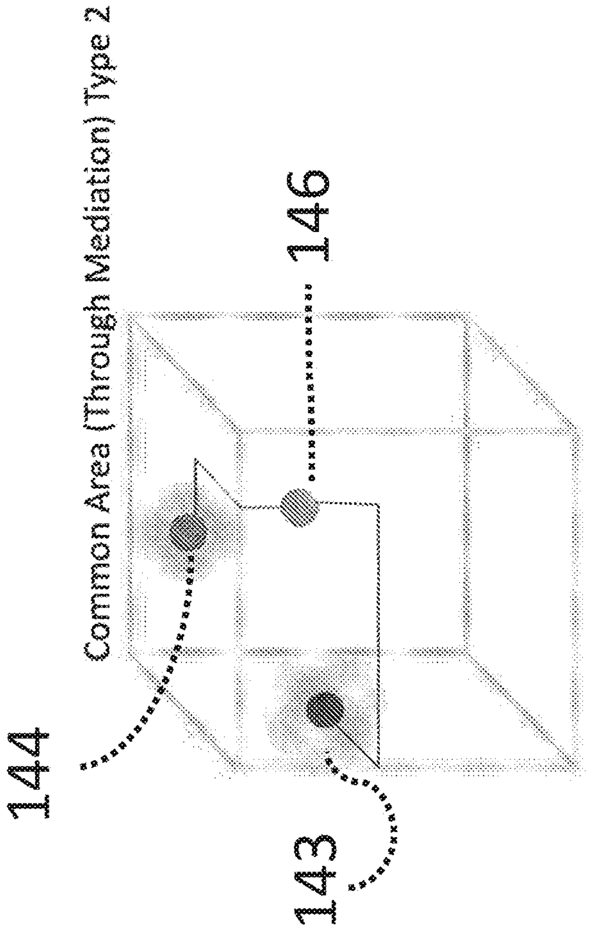
Figure 14C:
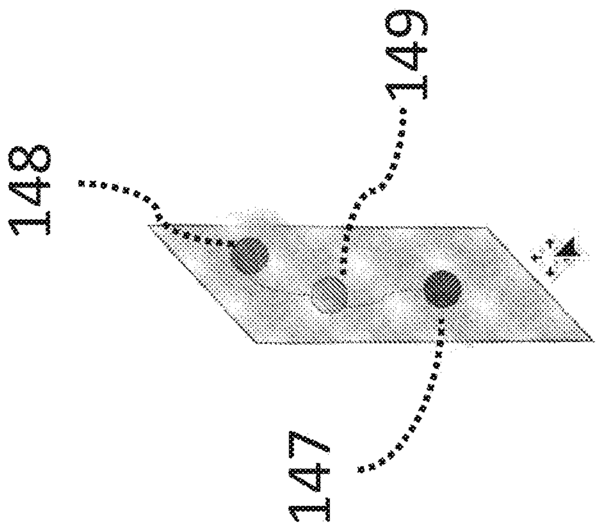
Figure 14D:
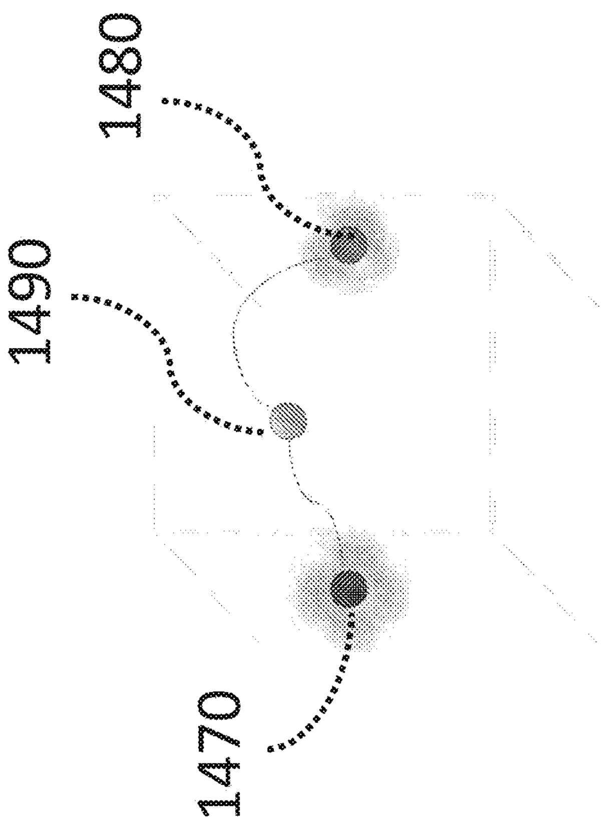

FIGS. 14*a*-14*b* are simplified diagrams of examples of common area types which include a mediation point. Thus FIGS. 14*a*-14*d* are simplified diagrams of example common (through mediation) areas of types 1-4 respectively.

Figure 15:
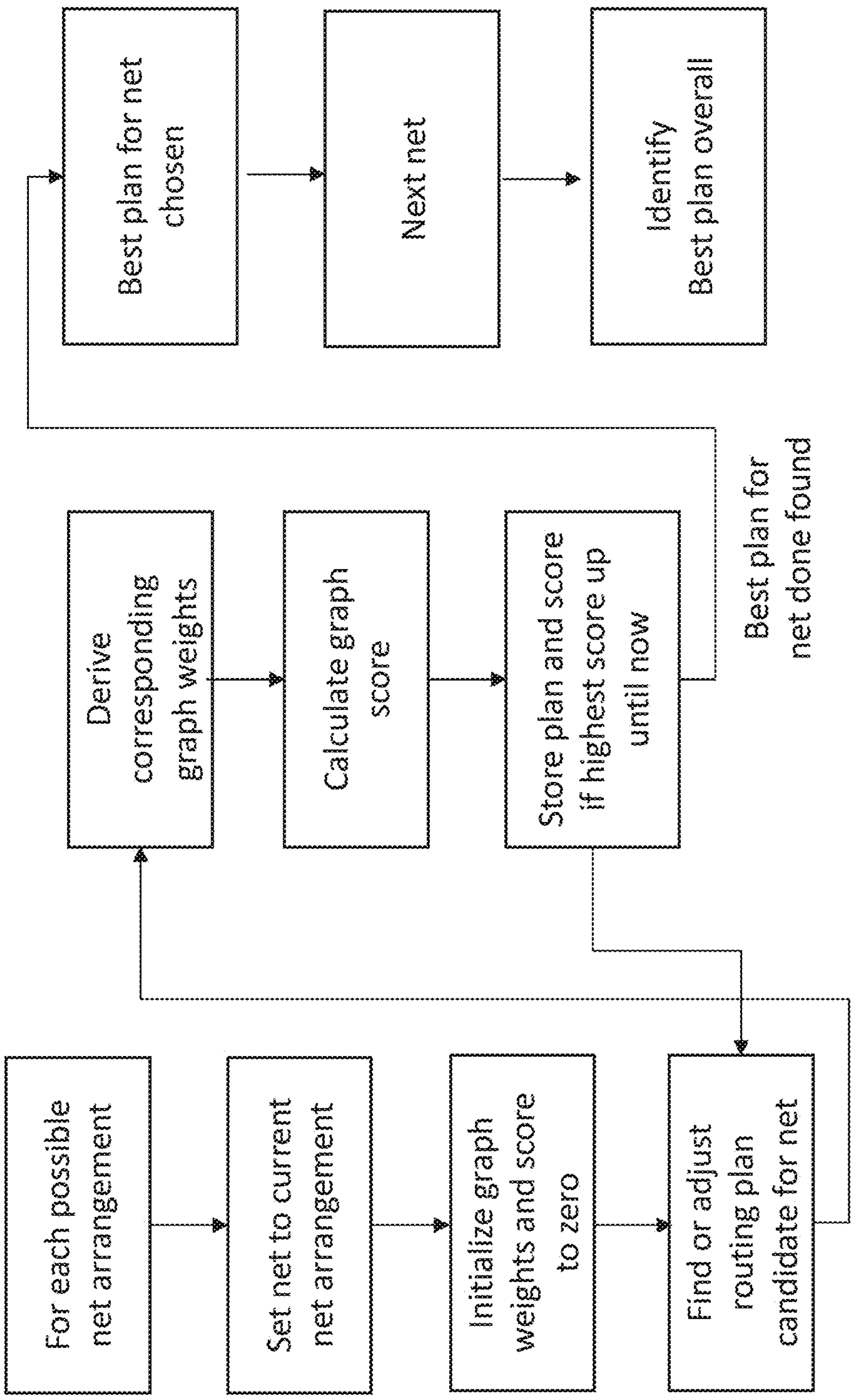

FIG. 15 is a simplified flow diagram for optimizing routing plan (generic room).

Figure 16:
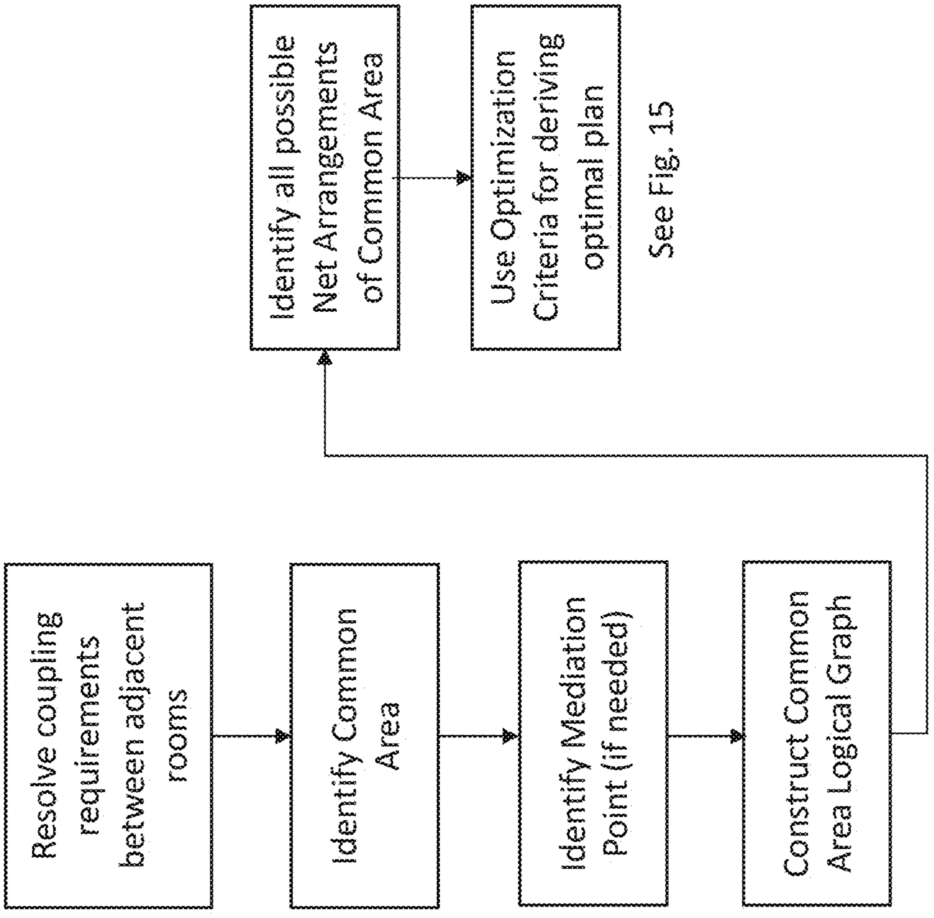

FIG. 16 is a simplified flow diagram for optimizing a routing plan for a common area (coupling between rooms).

Figure 17A:
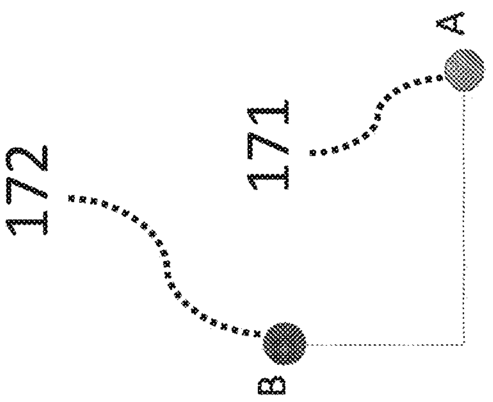
Figure 17B:
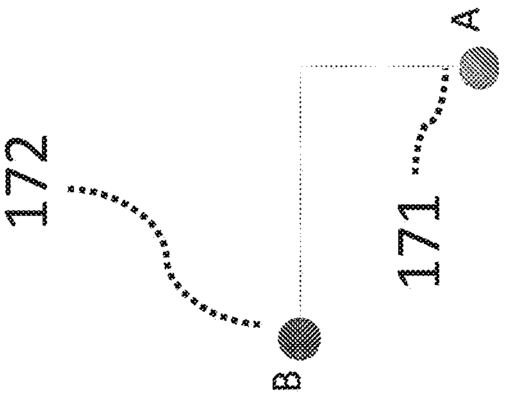
Figure 17C:
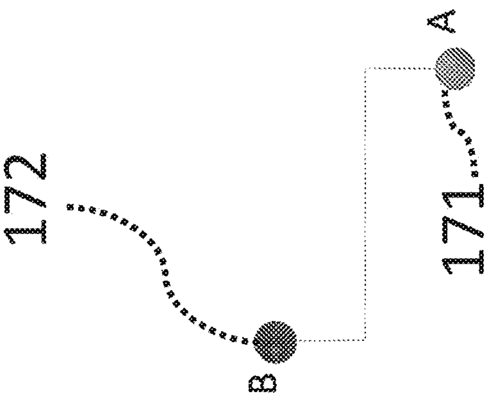

FIGS. 17*a*-17*c* illustrate an example of equal length routing paths with different "bending" strategies.

Figure 18:
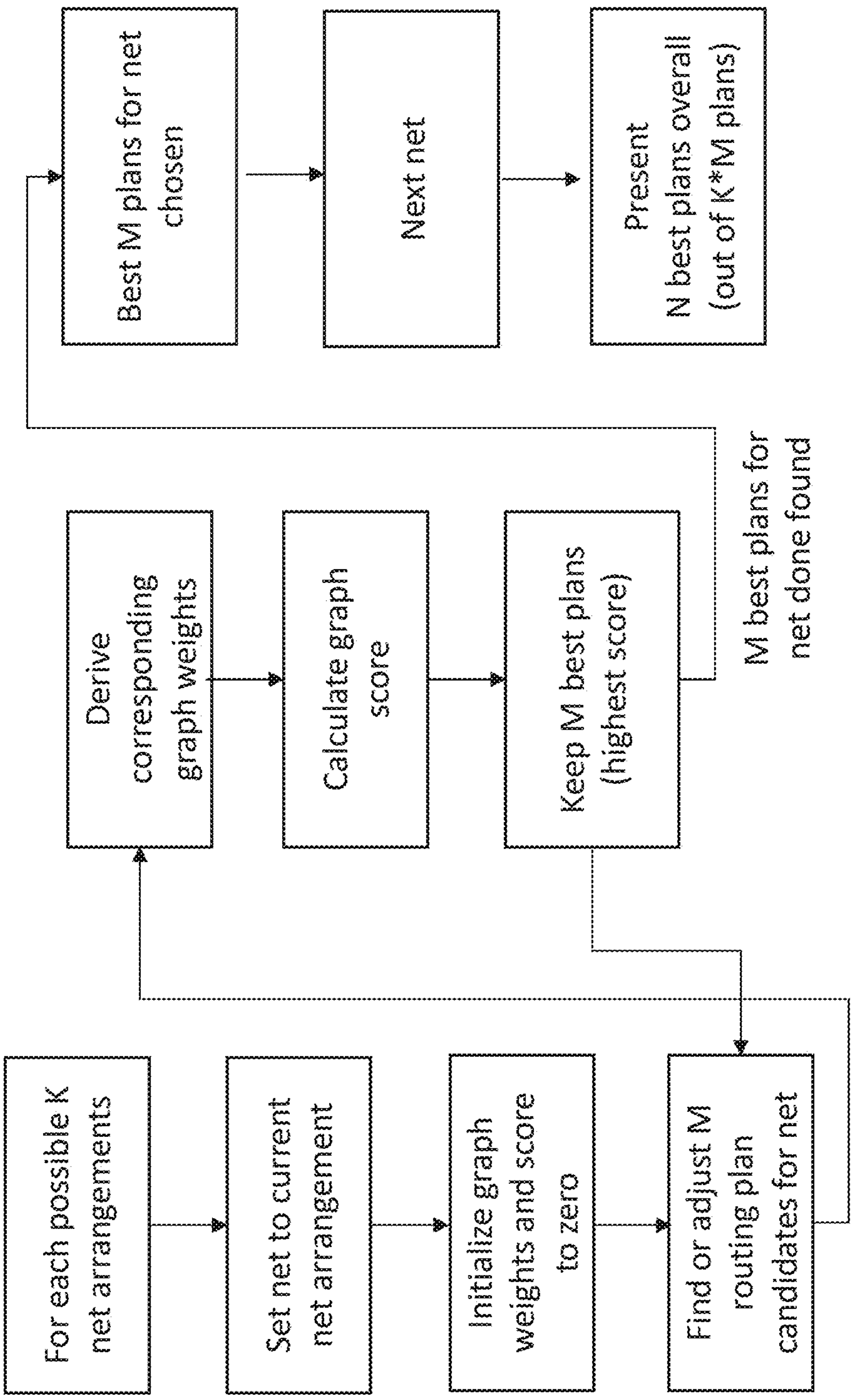

FIG. 18 is a simplified diagram Flow diagram for involving a "designer-in-the-loop".

Figures 19A, 19B:
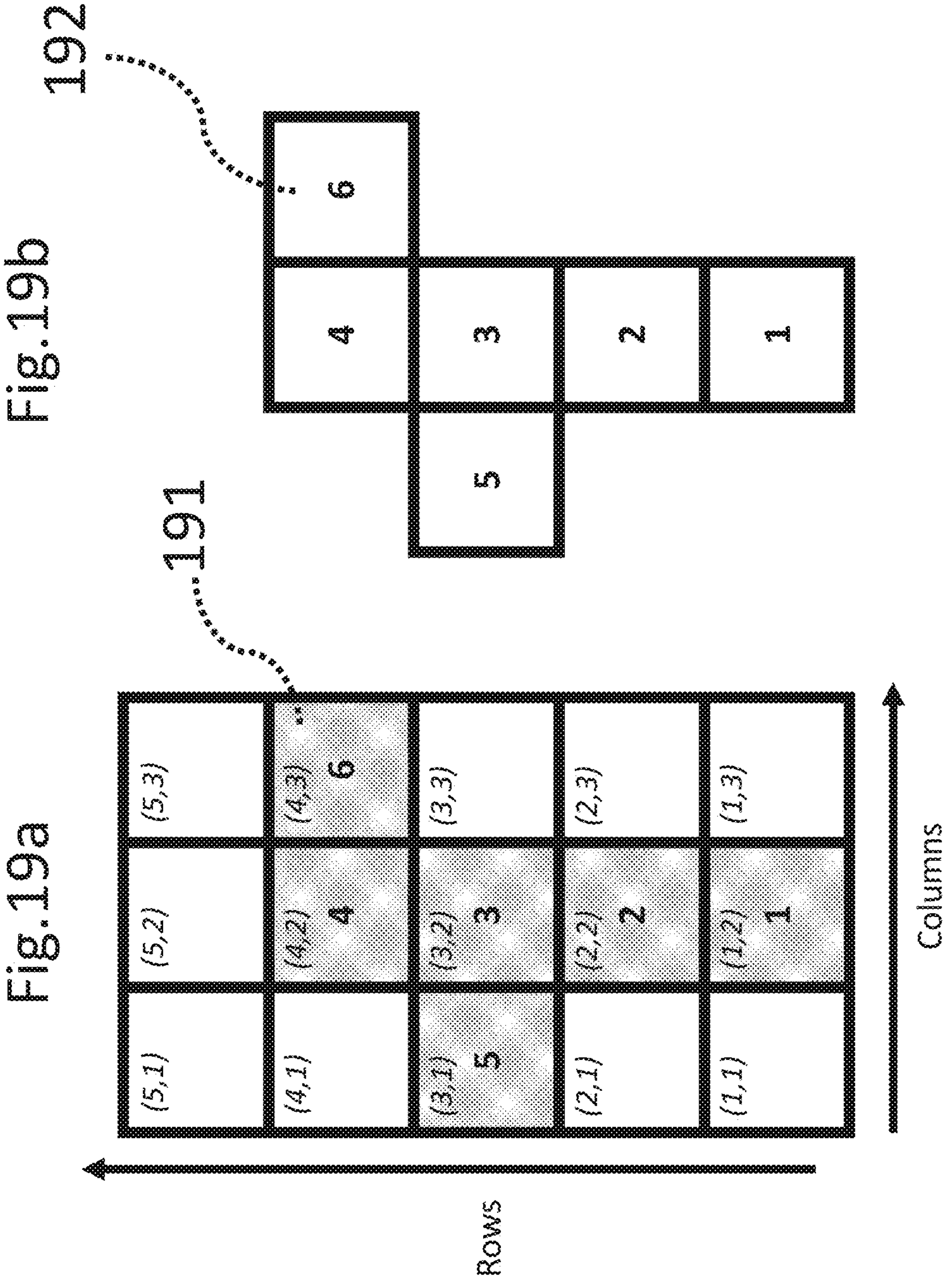

FIGS. 19*a*-19*b* illustrate a net arrangement data structure where rows are indicated by the vertical arrow, and columns are indicated by the horizontal arrow.

Figure 20A:
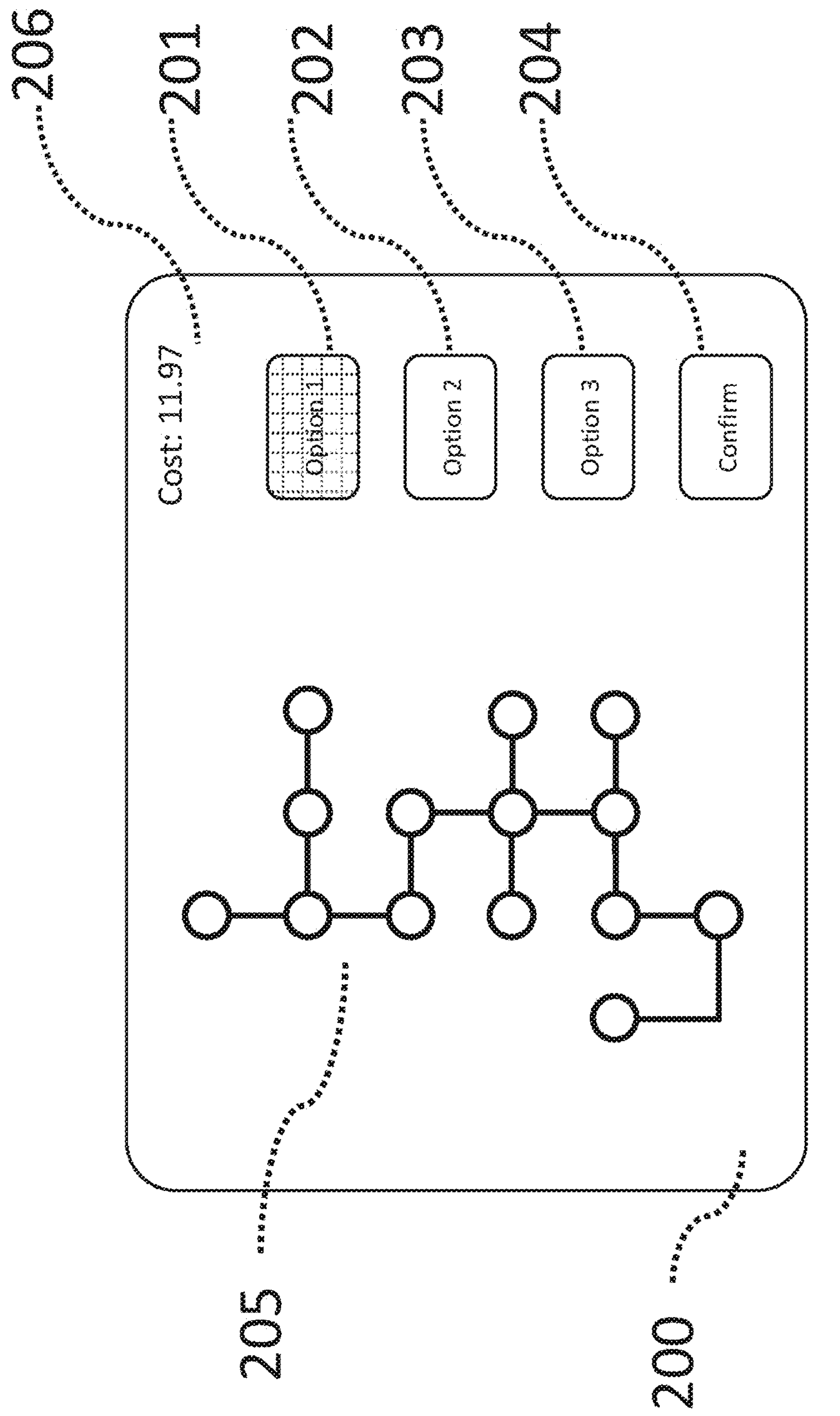

FIG. 20*a* is a simplified diagram of a screenshot example for designer intervention (given option 1).

Figure 20B:
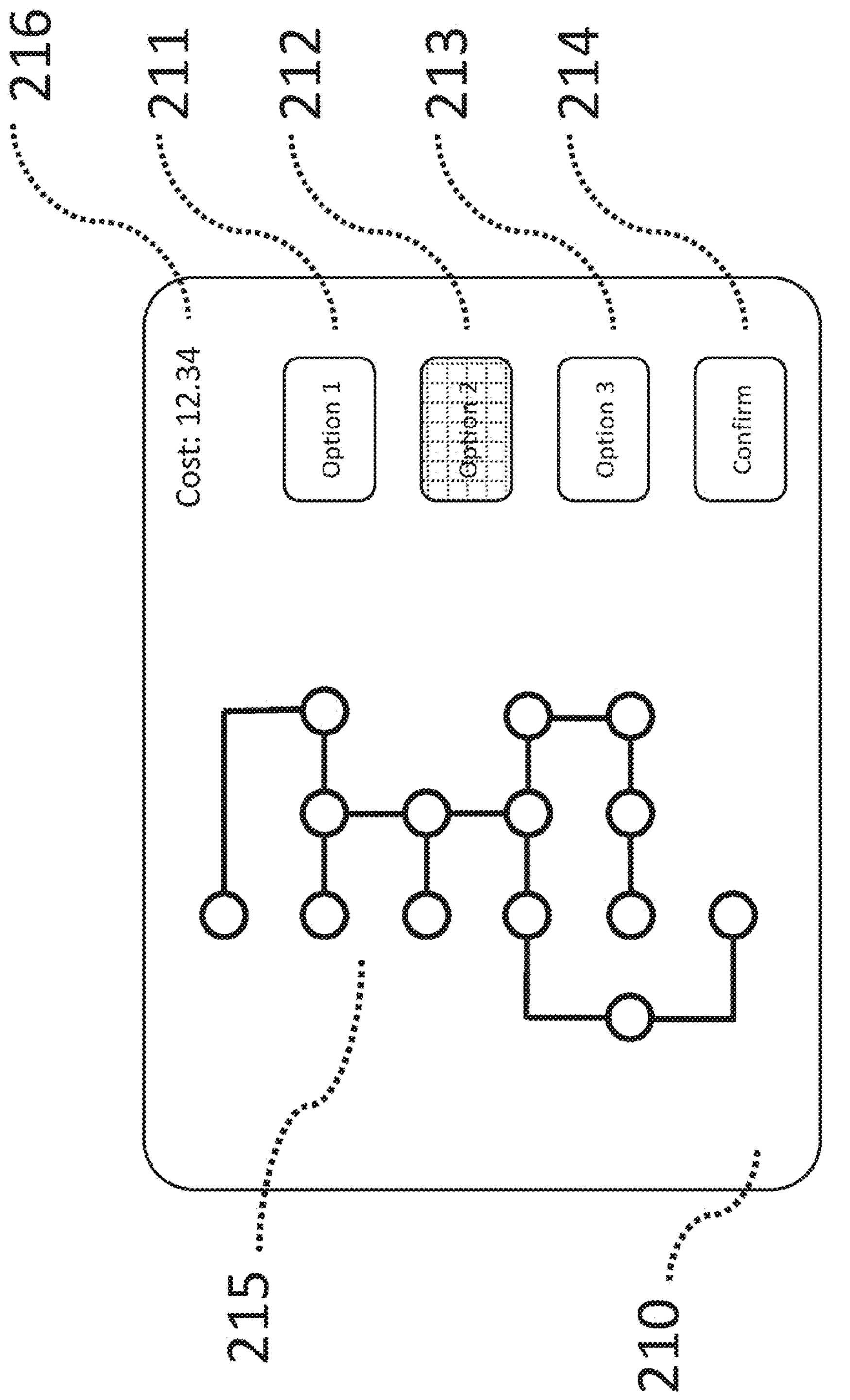

FIG. 20*b* is a simplified diagram of a screenshot example for designer intervention (given option 2).

FIGS. 21*a*-21*c*, 22*a*-22*b*, 23-25 are diagrams useful for understanding certain embodiments.

Methods and systems included in the scope of the present invention may include any subset or all of the functional blocks shown in the specifically illustrated implementations by way of example, in any suitable order, e.g. as shown. Flows may include all or any subset of the illustrated operations, suitably ordered, e.g. as shown. Tables herein may include all or any subset of the fields and/or records and/or cells and/or rows and/or columns described.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology) or any combination thereof.

Functionality or operations stipulated as being software-implemented may alternatively be wholly or fully implemented by an equivalent hardware or firmware module, and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case all or any subset of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option such as but not limited to FPGA, ASIC or DSP, or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use, and which is based on any suitable technologies such as semiconductor, magnetic, optical, paper and others.

DETAILED DESCRIPTION OF CERTAIN EMBODIMENTS

Regarding all flows either illustrated or presented in the text, it is appreciated that all or any subset of the operations presented may be provided, in any suitable order e.g. as shown or described.

In this specification, the term "net arrangement" may be used generally synonymously with "net". Each "net" typically comprises an arrangement of, typically, polygons typically including plural, typically non-overlapping typically edge-joined polygons, typically in a plane, which may be folded along the edges to become the faces of a prism or polyhedron such as a room.

3D to 2D Analysis

A software platform may be provided which facilitates routing automation encountered in building design. Routing automation includes connecting multiple points in a certain way e.g. connecting some points but not others (also defined as a plan). Although these points may be connected in several ways, typically a plan is sought which is optimal in some sense, meaning that some optimization criteria should be fulfilled through the design (e.g., minimizing the amount of materials used for the plan).

In FIG. 1, presented is a right rectangular prism. The system may be seeking for shortest path between the vertices or nodes A and C'. One upfront restriction is that, typically, the routing e.g. of physical connectors and nodes must (is required to) go only through the faces (e.g. walls and/or ceilings and/or floors) of the prism or structure (e.g., as with water pipes or electrical wiring within a wall). A straightforward approach would be to connect A to B, B to B' and then B' to C'. The length of such a path will be 1+2+3=6 units. A better approach would be to connect A to C and then C to C'. Using the dimensions of this example (AB=1, BC=2, CC'=3), the total length of this particular path is about 5.24 units.

FIG. 2 shows a prism's (or a polyhedron in general) net. The net is defined as an arrangement of non-overlapping edge-joined polygons in the plane which may be folded along the edges to become the faces of the prism (or polyhedron). More than one possible net typically exists (as demonstrated in FIG. 2 for a cube).

In FIG. 3*a*, while examining one possible net of the prism, it is seen that the shortest path (along which a pipe or cable may perhaps be laid) between A and C' is by drawing a straight line between A and C' on the net. The total length of this path is about 4.47 units which seems to be the shortest path possible.

A different net arrangement may lead to a different result (a different optimization candidate) as demonstrated in FIG. 3*b*. Although the straight-line connecting a and c' in this net is definitely the shortest path between a and c' (5.1 units approximately), it is longer than the one that may be achieved with previous net arrangement (4.47).

Thus, the search of the shortest path may be required to go over all possible net arrangements and computing the shortest path for each net. The optimal path may be determined by choosing the net which provided the shortest path among all possible nets.

Any method deriving an optimal path, is typically configured to review optimal path candidates (according to any given optimization criteria) over all possible net arrangements. The optimization criteria may be coupled with other path restrictions e.g. as discussed below.

In many cases, some part of the routing between elements may take place on the same face of the prism. In this case, and if these elements need to be interconnected, the need to go over all possible nets may be eliminated as the local routing (e.g., the same face) may not be affected by the specific net arrangement chosen.

In addition, and in contrast to the prism example, the building walls are not equivalent from a routing perspective. Different costs may be associated with different walls due to the material nature of the walls (concrete vs. wood vs. plaster vs. other), and/or their location (internal vs. external, floor vs. ceiling) and/or other considerations.

FIG. 4 shows optimization of an actual room (only the corner is shown for simplicity). Two electrical outlets are also shown, one on each wall. The optimization criteria in this case may be labor cost per meter (or ft.), ignoring the wiring cost. The best net arrangement for supporting the expected shortest path between these outlets is also easily noticeable.

In FIGS. 5 and 6, a ceiling of the room if added, as well as a guideline that any connection done through the ceiling has zero cost e.g. there is no effort required for connecting through the ceiling due to a stretch ceiling arrangement (suspended ceiling having a perimeter track and a stretchy fabric which clips into the track). In FIG. 5, a net (similar to FIG. 4) is used which seems not to change the routing recommendation.

In FIG. 6, a different net is used. It is apparent that if there is no cost associated with routing through the ceiling, then the routing in this case is the optimal solution, as a significant part of the path in this case is routed through the ceiling.

Also, in FIGS. 7*a* and 7*b*, three electrical outlets are to be connected together. In FIG. 7*a* (no ceiling), these outlets could be connected in a straight line, however in FIG. 7*b* (with ceiling), as there is no cost associated with routing through the ceiling, the connectivity options between outlets change accordingly, especially with the specific net arrangement chosen.

Optimization with Restrictions

In some cases, the use of net arrangements and their related search algorithms for deriving optimal routing plans, may need to consider various imposed limitations or restrictions which may limit the search space (for an optimal plan). These limitations or restrictions may be either pragmatical considerations such as structural components, which restrict certain routing paths, or regulatory guidance or maintenance preferences, which may prohibit certain areas to be part of the routing plan. In some cases, limiting the search space may simplify the routing procedure, while in other cases this may create certain complexities, yet in any case these may need to be taken into account.

Use of net arrangements and how related search algorithms may be deployed for resource distribution plans or routing plans, is now described with reference to FIGS. 21*a*-25.

Figure 21B:
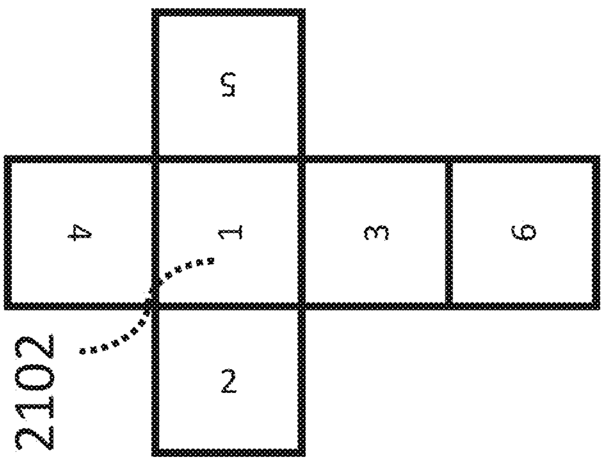
Figure 21A:
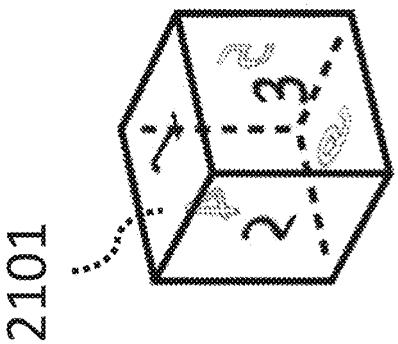

For example, consider a square shaped room (FIG. 21*a*), with numbered wall, ceiling and floor areas (faces) 1 to 6. A net arrangement e.g. as shown in FIG. 21*b* may be used to describe the following restrictions aka the "example guidelines", all or any subset of which may apply:

Restriction a. Floor area cannot be used for routing (Area 6 in FIG. 21).

Restriction b. Ceiling area is highly preferred for routing (Area t in FIG. 21*a*).

Restriction c: Surrounding walls—Areas 3,4 and 5, all have access to the ceiling area Restriction d: Face 2 aka Wall Area 2, has no access to the ceiling, only to adjacent wall areas 3, 4.

Restriction e: Face 5 aka Wall Area 5, is not accessible by adjacent walls (faces aka Areas 3 and 4) and is considered more difficult for routing.

Restriction f: Local wall routing is optimized independently. This simplified example can be extended to other cases, which may carry or be subject to more complex restrictions, for example by eliminating or relaxing some of the presented restrictions or presenting additional restrictions. These restrictions may be regarded or treated as limitations or (as in linear programming) as constraints. In many cases, routing of either electricity or water pipes through floor and ceiling structures is harder to maintain, and is therefore avoided. However, in many buildings the ceiling of the room is concealed by a lower artificial ceiling structure (e.g., stretched ceiling) which may conceal any routing between the artificial ceiling structure and the physical ceiling, and therefore favoring such a routing arrangement. E.g. as described above, some structural elements at wall corners (or wall to ceiling corners) may forbid the passing through of wires and pipes between these areas which create additional routing limitations. For example, if restrictions prohibit the use of a certain wall (or ceiling or floor) then for all subsequent net arrangements of the room (on the space used for routing purposes) the corresponding face of the 2D representation may be eliminated hence no routing path by definition will use this wall.

Figure 21C:
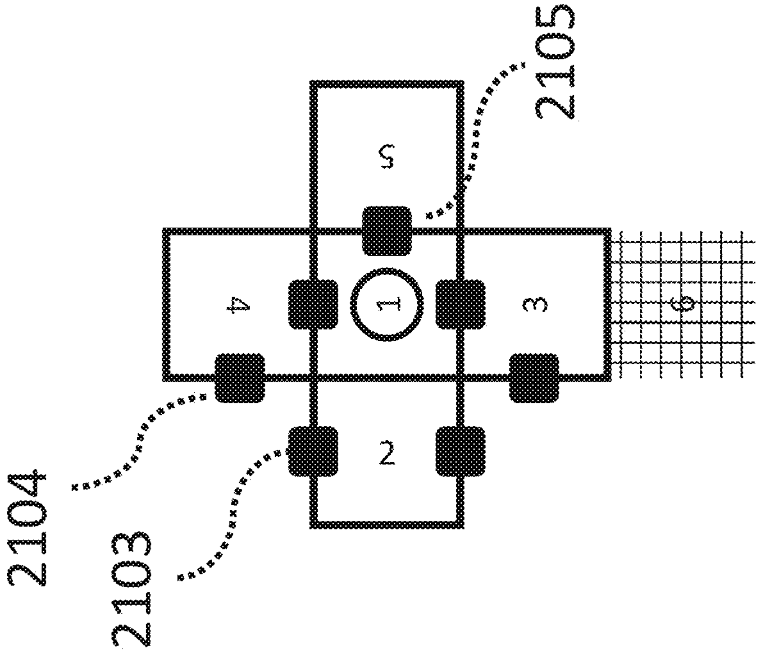

Referring now to FIG. 21*c*, it is appreciated that any suitable technology may be used to allow the system to automatically handle limitations like "don't use floor for connectors (of any type or of some specific resource network" etc. The designer may be prompted to input this data, and the server may, for example, identify net arrangements which are not compatible with the limitations, and remove them from consideration.

Figure 22A:
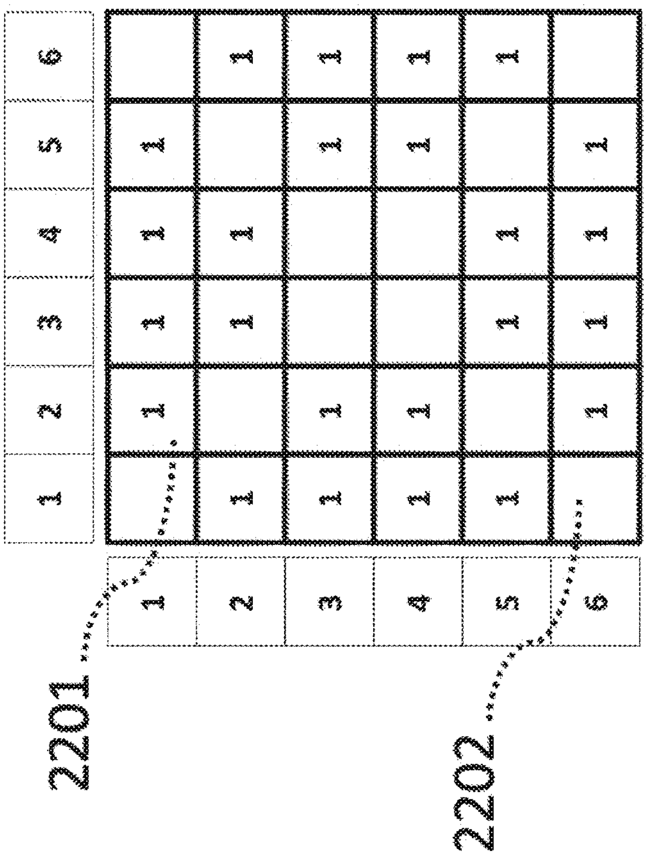
Figure 22B:
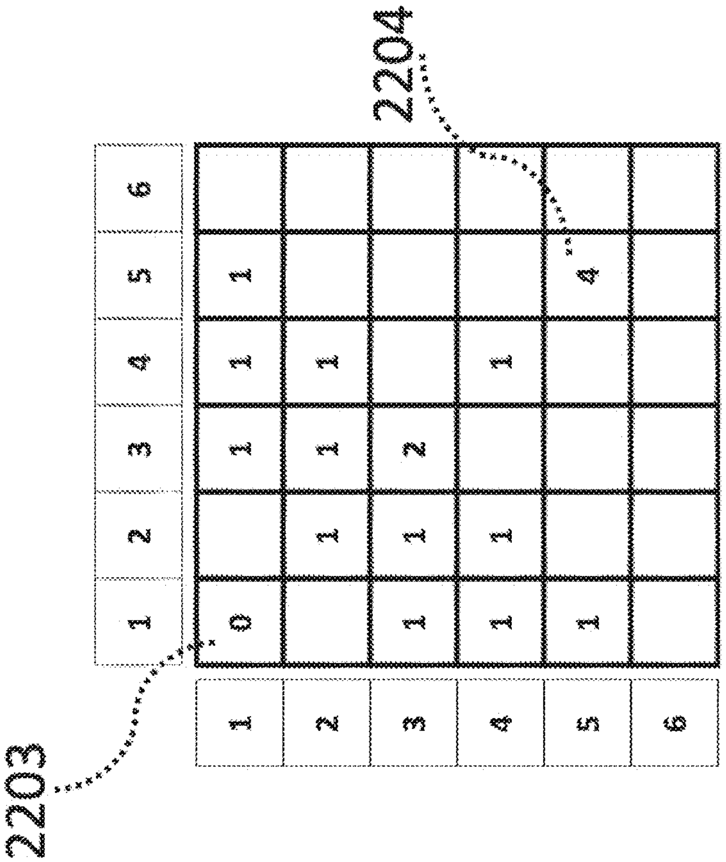

The black boxes 2103 in FIG. 21*c* represent an indication that passing between face X to face Y has been defined as allowed, for a specific architectural structure or project. FIGS. 22*a*-22*b* present allowances of crossing between faces, which influences the routing plan. Typically, the designer is prompted to fill in each of the cells of the matrix of FIGS. 22*a*-22*b*. For example, the system may present to the user a screen on which the user may graphically provide the data that the system then uses to fill the matrix, each matrix cell representing allowance for a given pair of faces.

In FIGS. 22*a*-22*b*, an alternative representation is given. A connectivity matrix arrangement is used to describe possible connections between wall areas e.g. which pairs of wall areas are connected (1) and which are not (0). On the left side matrix of FIG. 22*a*, if no restrictions were given, then for example, wall area 3 is shown to be connected to wall area 1, 2, 5 and 6 as indicated by the corresponding row and the number 1 in each column corresponding to a connected wall. Areas with no connection between them may be indicated by a 0 (although this is not shown for visual simplification reasons). Actually, with no restrictions given, each wall is connected to four other walls. The matrix of FIG. 22*b* represents the room example with all restrictions given. diagonal elements ([1,1], [2,2], etc.) indicate the routing difficulty level for the optimization process. For example, Area 1 (the ceiling), has a zero cost associated with it (e.g., zero work effort, zero material costs), while the wall of Area 5 has a level 4 cost associated with it. All other walls have a level 1 cost. Connectivity restrictions are also implied by the matrix. For example, row 6 has no connectivity options at all, while wall Area 2 is shown to be connected to wall Area 3 and 4.

Figure 23:
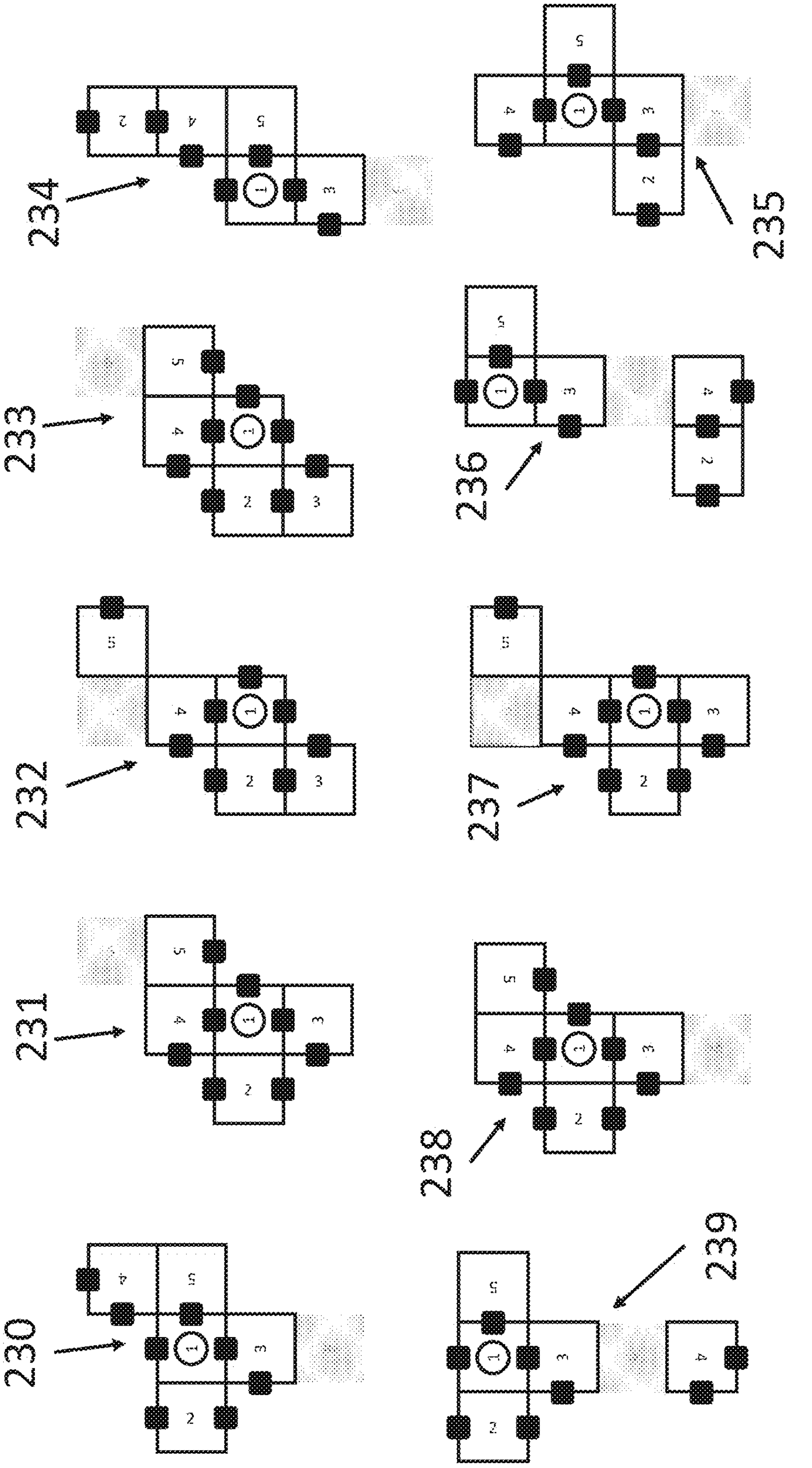
Figure 24:
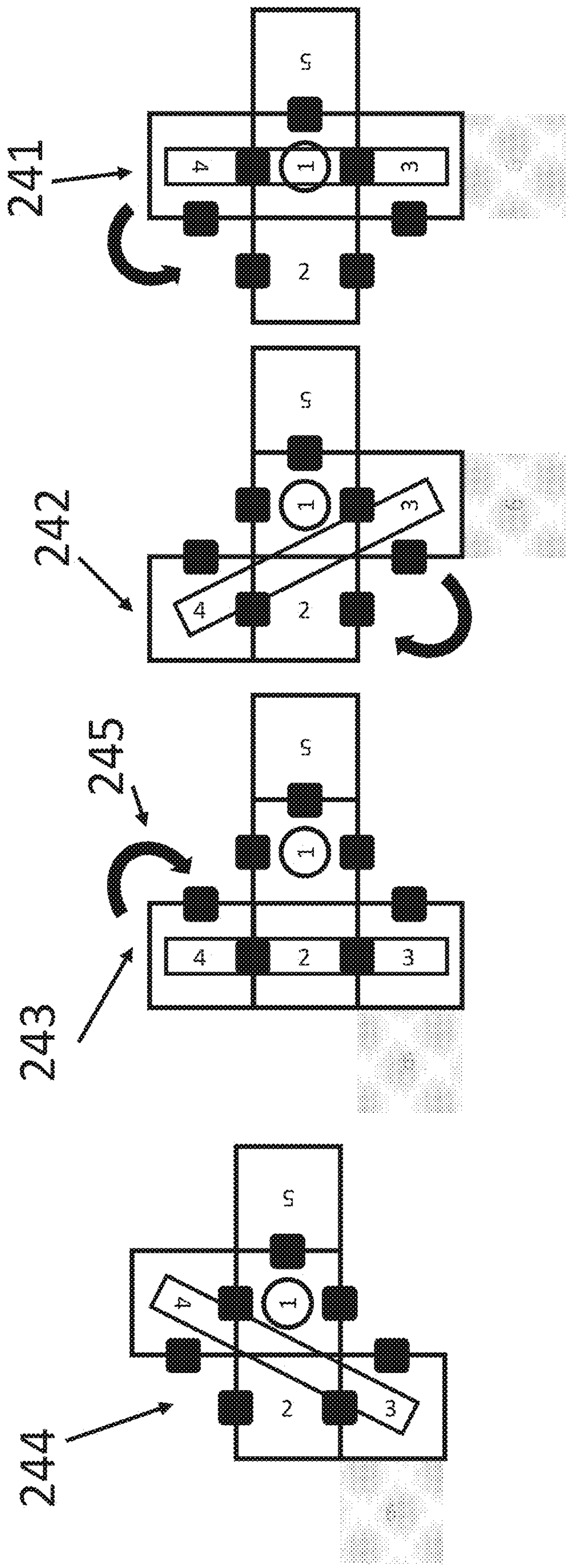

The restrictions, as reflected by the connectivity matrix, may be used to redraw other possible net arrangements, as described in FIG. 23. A specific net arrangement perspective (e.g., which area number is on top) may assign other areas accordingly.

Consider the case when the routing algorithm examines the possibility of connecting a socket on the center of wall Area 3 with a socket on the center area of wall Area 4. If the original layout (1 in FIG. 24) is examined, then connecting these areas is possible (3 to 1 to 4). Additional layout possibilities are revealed by turning wall Area 4 and wall Area 3 (which creates the additional net arrangements for this problem). However, the $2^{nd}$ and 40 layouts call for a crossing between wall Area 2 to the ceiling (invalid) while the $3^{rd}$ layout (3 to 2 to 4) is a valid option. Crossing through the ceiling is, in this example, costless, hence the choice between the crossing indicated by $1^{st}$ layout and the $3^{rd}$ layout depend on the exact socket locations. If, for example, the sockets are close to the ceiling, then the crossing indicated by the $1^{st}$ layout may be preferred as the path may be going from 3 to the ceiling, and then going down back from the ceiling to 4.

Figure 25:
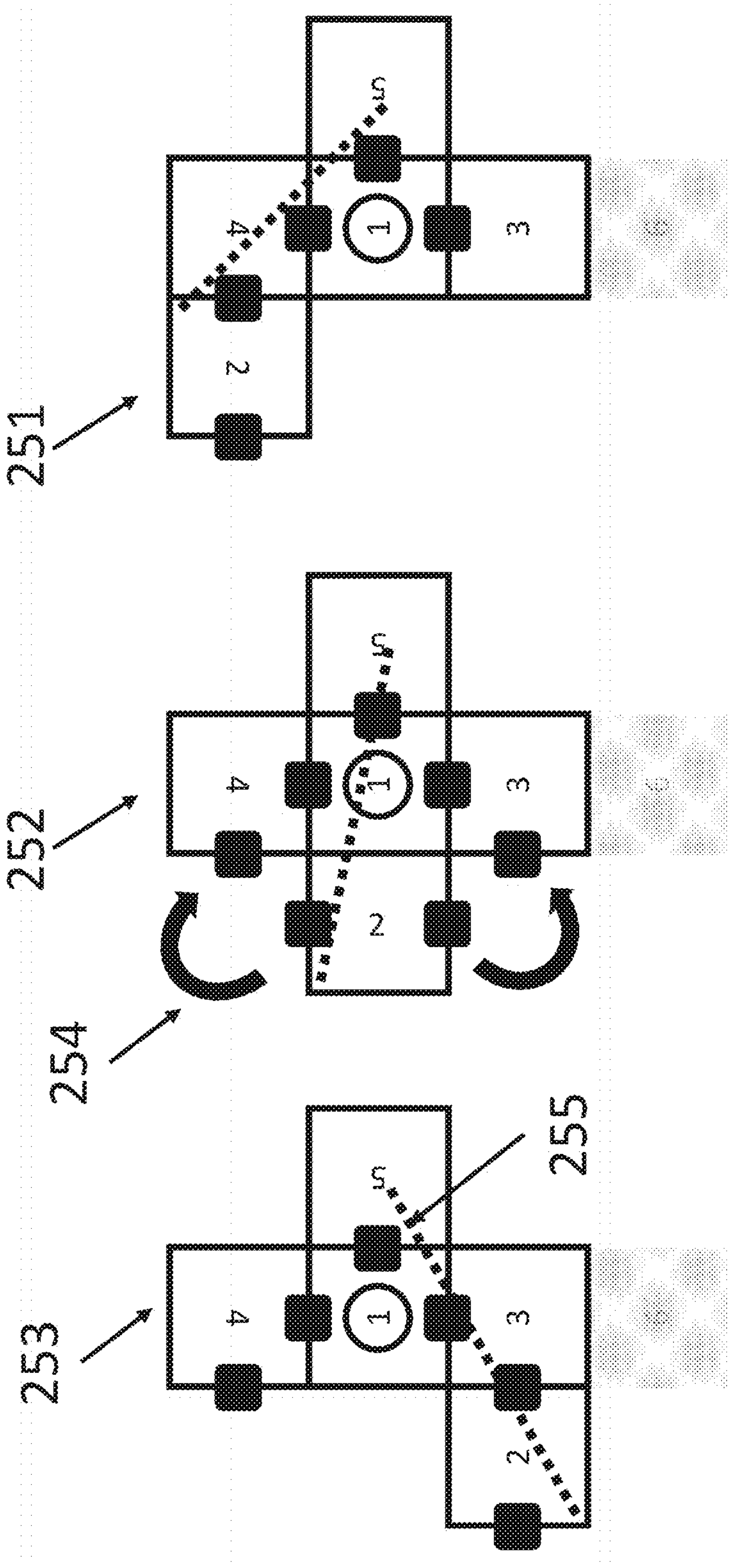

In an additional example, as shown in FIG. 25, some routing path between a socket on wall Area 2 (lower left) and a socket on wall Area 5 (center) is required. The original layout is actually the middle one, Layout 2, and, as demonstrated, creating a path between Area 2 to Area 5 through the ceiling (Area 1) is impossible as no direct crossing is allowed between Area 1 and 2. If Area 2 is turned clockwise or counter clockwise, then 2 additional layouts (1,3) are presented. Layout 1, presents a path from Area 2 to Area 4, then to Area 1 (ceiling), and then to Area 5. Layout 2 presents a path from Area 2 to Area 3, then to Area 1 (ceiling), and then to Area 5. Choosing one of the possible paths depends on the exact location of the sockets and cost function values (e.g., the cost of the path from the optimization function perspective).

In some cases (e.g. as indicated by restriction f—"Local wall routing is optimized independently") in the example guidelines, the local routing requirements may be handled autonomously or independently. For example, several electrical sockets which are arranged on a specific wall may be positioned according to some 2D plan—either dictated, or as an outcome of a 2D optimization process (e.g., traveling salesman algorithm, or alternatives or modifications thereof). In these cases, there may be at least one anchor point—a socket which may be used for connecting the wall to other areas. In these cases the 3D optimization process may focus on connecting the anchor points in some optimal way.

Logical Graph

The optimization process may require the system to go through (e.g. consider each of) various net options, taking into account other considerations which may be imposed by various aspects of the routing design. There may be a need to decouple between the logical graph which describes the connectivity between elements (and points) and the so-called physical arrangement, the net, which is used for analyzing the cost related issues of the routing (connectivity) efforts.

For example, referring again to the examples in FIGS. 1, 3*a* and 3*b*, the logical graph may comprise a 2-point graph connecting A and C' as demonstrated in FIG. 8. This graph does not change in its structure as the system proceeds through various net options. Each net option leads to a different minimum length path which only changes the connection weight of the graph, but not the graph itself.

A generic case is presented in FIG. 9. In the physical world, the elements (or points) which may need to be connected or routed together, are positioned at some three-dimensional space locations on the walls of some physical structure. In the graph, example connectivity requirements (how elements or points connect to other elements or points, if at all) are presented. Specifically, there are three faces of the cube in FIG. 9 which all have some connecting points. They are represented in the graph. In this particular example, only the point in the center of the graph needs to connect individually to each other point.

In FIG. 10, different net arrangements associated with the original structure, impose different restrictions (or on the other hand promote certain possibilities) regarding physical connectivity. E.g. as described above, different costs are involved with each arrangement. In FIG. 10, the actual costs are represented in the graph by different widths (the higher the costs, the wider the path). The left figure (A), represents a net at which the cube top is placed far from the other sides of the cube (which have some points to be connected with) hence imposing longer paths between the "green" or "g" points and others. The right figure (B), represents a net at which all the sides with connection points are nearby, hence facilitating shorter pathways between most of the points.

A logical graph may be used to provide a typically fixed representation of connectivity necessities between elements (points). A suitable method is shown in FIG. 15. As the logical graph is independent of a specific physical net chosen due to optimization analysis, this permits a search algorithm to decouple between the logical domain and the physical domain of the routing problem.

Prior preparation or pre-processing for the routing algorithm (e.g. as described in FIG. 15) may include an initial process or operation/s which may be performed prior to the optimization process itself, in which nets e.g. all possible net arrangements, are identified. For example (see e.g. FIG. 2), the possible net arrangements of a cube include 11 different variations, however due to missing walls (or walls which no routing infrastructure may pass through) the number of variations may decrease, and only a subset of variations may be used. Storing or referencing a specific net arrangement may be performed in any suitable manner. For example, using FIG. 2 as an illustrative use-case, it may be deduced that for a cube, the longest net arrangement is 5 times the cube's side, and the widest net arrangement is 3 times the cube's side. A 5 by 3 matrix (or table) may be provided which defines a two-dimensional grid to be used for describing a possible net arrangement. For example, as described in FIG. 19, the cube sides or faces may be labelled faces 1, 2, 3, 4, 5 and 6, and consider a specific net arrangement. With this net, the matrix position (3,1) stores the number 5 and means that cube face 5 lies at this position. Matrix positions (1,2), (2,2), (3,2) and (4,2) contain sides 1, 2, 3 and 4 respectively. Matrix positions which either store zero or null, indicate that no sides or faces are placed or present at this position.

This example may be used for a more generic polyhedron and the information stored at each position; may be replaced with a complex record of information (related to the prism side) such as relative directions and orientation. For example, each matrix position or cell may contain a binary value (0 or 1) and/or a numerical value (integer, floating point) and/or an alphanumerical string and/or a record (e.g., a group of values of various types) and/or set of instructions (computer code to be executed when the object is processed or examined) and/or an object (e.g., a group of values and set of instructions to be activated or executed when processing or examining the object with or without object inheritance properties). For example, for a position (i,j), a binary value may be indicative of the absence or presence of a certain characteristic (e.g., connection allowed between face #i and face #j); a set of instructions (e.g., code subroutine #l) may indicate what function is to be performed while handling face #i with respect to face #j (e.g., retrieve all nodes of both faces).

The end result may be that all possible net arrangements follow a consistent representation methodology. Any representation methodology may be used, and the one described here is only an example (see e.g. FIG. 19).

A logical graph which represents the connectivity objectives of the plan, is typically also defined. Any suitable method to store graph connectivity characteristics may be employed. For example, for each node [i] of the graph, a vector, Vi, may comprise or consist of node numbers, indicative of required connections between node [i] and the other nodes. Another similar option is to use a N×N matrix (N—the number nodes), C, which each position (i,j) of the matrix C, indicates if a connection between node (i) and node (j), exists (e.g., 1 indicating a connection and 0 indicating no-connection). Using this example, the system may also use another matrix W, similar in dimensions to C, which represents the weights (e.g., significance, cost, etc.) of the connections. If C(i,j) is non zero (hence node (i) and node (i) are connected) then W(i,j) represents the weight of this connection.

When a specific net arrangement is investigated, different routing plan candidates may be examined. For each candidate plan, the path costs are computed according to the restrictions and possibilities for the net.

The method may include all or any subset of the operations of FIG. 15, and/or all or any subset of the following operations ("flow g"), performed in any suitable order e.g. as shown:

Operation g-1: T is the set of net arrangements to be considered (e.g. a list or a vector dimension equals to the number of nets); C represents the logical graph matrix (typically a square matrix with a dimension corresponding to the number of nodes); W represents the logical graph weights; S, Si, So represents score variables; Pi and Po represent the best routing plans for each net arrangement Ti and the best overall respectively.

Operation g-2: Set So (the optimal score) to zero.

Operation g-3: Retrieve the next net arrangement Ti out of the set T. If no more net arrangements are available, go to operation g-10.

Operation g-4: Initialize W to all-zero. Set the intermediate score variable Si to zero.

Operation g-5: For the current net Ti, with logical graph C, utilize a regular 2D routing plan algorithm Operation g-6: 2D routing plan algorithm proposes a candidate plan P Operation g-7: For P (routing plan candidate, as available by the previous operation's processing outcome or the output of operation g-6) compute W and score S.

Operation g-8: If S>Si then store the following: current plan as best plan for Ti (set Pi=P), set S=Si and W.

Operation g-9: Continue the routing plan candidate search (operation g-6) until some halting criteria is met (for example, no significant improvement in Si within some minimal number of iterations).

Operation g-10: If the search is terminated, then store best plan Pi for Ti and its associated graph weights and score and go to operation g-3.

Operation g-11: After all possible net arrangements are analyzed, and the best routing plan for each net arrangement Pi is recognized, the system may select the net arrangement which led to the best score (maximum Si) and consider its best routing plan Po as the overall optimal routing plan which may be the one chosen for the design process.

Storing the intermediate best plans for each net arrangement may be advantageous e.g. for human intervention e.g. as described below.

Each net "investigation" may be performed using well-known 2D optimization algorithms (such as but not limited to Dijkstra's algorithm, Bellman-Ford algorithm, "a" algorithm) for routing and connectivity, as used in other industries such as in electrical circuit board design.

The method may be modified for emphasizing certain net arrangements over others by weighting the scores of the different net arrangements in an uneven way.

Multiple Rooms Graph Representation

In many cases the routing problem extends beyond a single room. Although each room's routing considerations are somewhat independent, eventually certain dependencies between rooms, offices, public shared places and apartments exist due to various reasons e.g. all or any subset of the following:

1) Resources are shared—For example, the water supply of a house starts at a single entry point which may eventually split between various apartments and rooms.
2) Location dependencies—The presence of a connection point in one room, might dictate (or rule out) the presence of the connection point in another.
3) Resource management and maintenance—In many cases the certain rooms may need to be connected to some central or common location for easier management and maintenance issues.

In FIG. 11, the cubes represent two somewhat independent rooms with their own routing considerations, which are represented by their own associated graph. Some relationship exists between point A (on the right cube) and point B (on the left cube).

1) Points A and B may be located on the same wall (or attached or shared walls, face to face). In some cases, points A and B are coupled either by location or connection (they are connected between themselves), or both. There may be more than one pair of points which are coupled in this sense.
2) The shared wall may include other points (elements) which are part of a graph representing routing considerations of the shared wall. These considerations could be additional, and independent, of those which govern any of the rooms.
3) The walls on which points A and B are located, are also part of another room or area (defined as a common area), on which some other routing considerations exist. Other points (elements) may exist in the common area, which, together with A and B, form an associated graph for the common area. In this area points A and B may be directly connected, or not. What is important is the fact that they are part of another graph. Other walls (or a ceiling) which surround the common area may include other similar cases of other paired points (such as A and B).

As seen in FIG. 12, point A and B also exist in the common area itself. E.g. as described above, a common area may be a room but may also be a corridor, hall or any common area to the adjacent rooms. No matter what the physical use of this common area is, it may be treated (for routing optimization considerations) as any other room using the techniques E.g. as described above.

In FIG. 13, examples of possible common area types are shown. For example, with type 1, A and B are located on walls facing one each other. With type 2, A and B are located on adjacent walls. With type 3, A and B are located on the same (shared) wall or e.g. as described above, this could be a case at which 2 parallel walls are attached and belong to different rooms. With type 4, actually no physical common area exists—in this case the points are forced to be coupled or connected by wire or pipe or some other means (depending on the routing purpose).

In FIG. 14, which is based on FIG. 13, mediation is defined, according to embodiments. E.g. as described above, in many cases due to resource management and maintenance considerations, certain rooms may need to be connected to some central or common location for easier management and maintenance issues (e.g., fuse box, WiFi router). In this case point A and point B are required to connect to some mediating point somewhere within the common area. Of course, there could be more than just point A and point B (e.g., an additional third room with point C etc.). Similarly to the situations presented by FIG. 13, the system may add the associated types when a mediation point is part of the connectivity considerations and the routing plan. For example, type 1 may represent a case in which a cable connection box is installed in the ceiling area, and connecting points from nearby rooms are arranged through facing walls in the common area. The mediation point locations, as presented, are only examples, and mediation points could of course be located in various other positions within the common area. The system may, e.g. as described above, derive a logical graph of the common area representing connectivity requirements, and determine the optimal routing plan using techniques, e.g. as described above.

Prior preparation or pre-processing for a routing algorithm of the common areas (e.g. as described in FIG. 16) may include all or any subset of the operations included in the following flow ("flow a") which may be performed in any suitable order e.g. as shown:

Operation a-1: Resolve any coupling requirements between adjacent rooms e.g. by identifying the points whose location might be influenced by the existence and location of points of adjacent rooms.

Operation a-2: Determine if these points need to be connected directly between each other.

Operation a-3: The common area is acknowledged; this is the area in which some of its boundaries are adjacent rooms with some interconnection requirements.

Operation a-4: If required, a mediation point is identified in the common area, and its location and connectivity requirements (e.g., a fuse box). Existence of a mediation point in a common area is optional.

Typically, at this point, the common area is completely defined, and the following flow b (which may employ certain operations in FIG. 16 as shown) may be performed; flow b may include all or any subset of the following operations and may be performed in any suitable order e.g. as shown:

Operation b-1: A logical graph (of the common area) representing its connectivity requirements may be created.

Operation b-2: All possible net arrangements of the common area are identified. The optimization criteria (for the routing plan) is formalized e.g. as described above (e.g., minimum length of wiring, zero cost path areas, etc.).

Operation b-3: The system may apply the method of FIG. 15, and, as a result, derive the optimal routing plan for the common area Multiple Resources, Multiple Layers Embodiments herein may be useful. even when more than one resource is distributed through a routing plan e.g. by designing routing plans for each of plural resource networks. For example, this could be the case in which high voltage (110V) and low voltage supply needs to be distributed through the building for different purposes (e.g., high power devices vs. low power devices such as LED lighting), or the case in which water and sewage needs to be circulated through the house using the plumbing network in addition to other systems. Handling the design of these routing plans may be somewhat independent, with some influence on each other to be identified.

Optimization criteria for each resource may be different. Hence the techniques described herein may be reapplied for each resource and its elements (points) or nodes, using a corresponding optimization goal e.g. using different optimization criteria for each resource. For example, for one resource, the optimization may favor minimizing the amount of materials for achieving connectivity, while for the other resource this could be the work effort (which may encourage materials' waste, but the work may be easier to execute). Also, the guidelines and restrictions for each resource distribution effort may differ, either due to regulations (e.g., plumbing done at certain angles) or flexibility of the physical connection itself (e.g., cannot be installed in ceilings, cannot accommodate 90 degree turns, etc.).

Some coupling may exist between resources, as they either may impose restrictions (e.g., no electricity near water supply) or recommendations (e.g., use the same pathways). All of these issues may be translated to specific connectivity rules and restricted routing zones.

Prior preparation or pre-processing for the multiple resource routing method (e.g. the method of flow d) may include performing "flow c" which may include all or any subset of the following operations, suitable ordered e.g. as shown:

Operation c-1: Define a typically unique optimization criterion for each of the resources (e.g., water, electricity, etc.) which may require a routing plan. The optimization criterion for each resource typically corresponds to its specific nature. For example, it could be that water piping planning may emphasize labor optimization (e.g., amount of work), while electrical wiring planning may emphasize wiring length.

Operation c-2: In addition, for each resource, an associated list of restrictions and guidelines may be identified, creating the corresponding connection rules. For example, draining systems (e.g., sewage) may require specific angle positioning for insuring sewage flow, or, as another example, electrical wiring considerations may limit the number of connections per junction etc. Typically the connection rules are translated in advance to pre-defined functions which correspond to or represent the rule or consideration. In the case of the draining system, if there is an angle limitation, the software may check if the current proposed path complies with the rule or consideration by sending the path data to a process which checks all existing limitations for the path (e.g., given nodes, node types, faces, network type process all rules and confirm compliance).

The multiple resource routing method may include the following method (flow d); when executing flow d, all or any subset of the following operations may be performed, in any suitable order e.g. as follows:

Operation d-1: Apply the method of FIG. 15, or alternatives, for each resource, typically using its specific optimization technique, guidelines and restrictions for establishing their associated optimal routing plan.

Operation d-2: the process may be repeated in a different resource network order (e.g., water, then sewage, then electricity, rather than electricity, then water, then sewage) to detect if the order preference may change the optimal routing plans and their associated scores. Selection of the final plans may follow an optimization process of its own. Some examples:

Example a. Selecting the order of resources which led to highest (if searching for maximum or lowest if searching for minimum) sum of scores of all plans. For example, in the case of two resources, water and electricity, when water is done first, the scores of the best water supply plan and the best electricity supply plan are 2.1 and 1.0 (sum=3.1), while if electricity is done first, the scores are 0.8 and 2.2 (sum=3). If the scores are indicative of some performance metric, then the system may choose the first option (water supply done first), as the score sum is higher.

Example b. Selecting the order of resources which led to the highest (or lowest, e.g. as described above) weighted sum of all plans, where the weights are chosen according to some importance or priority factors (e.g., water plumbing optimization is prioritized higher than electrical network optimization). For example, in the previous case, it may be known that the electrical supply plan consideration is to have preference over the water supply planning (e.g., schedule) and the system may weigh the water supply and the electrical supply planning with the factors 0.2, 0.8 respectively. In the first case, the weighted sum may be 1.22, while in the second case the weighted sum may be 1.92, which is higher, hence, the system may choose the second option (electricity planning done first).

Example c. Selecting the order which led to the highest (or lowest) value of a function of all scores of all plans. For example, the function could be retrieving the maximum value among scores. In the previous example, the first option may result at 2.1, and the second option may result at 2.2, hence the second option may be chosen accordingly.

Designer (Human)-In-the-Loop

It may be useful to allow for some "human" intervention through the design process, as some of the design considerations cannot be captured only by computational optimization. Such considerations, which may be somewhat concealed, may require algorithms involving automated learning processes, such as re-enforcement learning.

Thus it is advantageous for the designer to be exposed to more than one alternative (routing plan candidate), and pick and choose, out of those, the one which the designer favors most. The alternatives may be presented with some score related information (e.g., cost of materials, work effort, etc.) which may support the designer's decision. In FIGS. 20*a* and 20*b*, sample screenshots are presented to the designer. In FIG. 20*a*, a related score is presented, and the first option is shown. In FIG. 20*b* another alternative is presented, and the second option is shown. In both screenshots, the designer may accept one alternative by pressing on the "confirm" button. In many cases, some design considerations are not governed directly by a score (as aesthetics of the design), while some considerations may be influenced by it.

The routing plan candidates are a result of using different net arrangements e.g. as described herein, and the common 2D routing algorithm being employed by the optimization engine. For example, if the system is configured to allow for two candidates to be presented to the designer, one may originate from one net arrangement, while the other one from another net arrangement, or both may originate from the same net arrangement, yet the 2D routing algorithm was the one promoting two alternatives for the same net. In the general case, the system may be configured to, say, present the top-N (N>=1) candidates of all net arrangements and 2D routing algorithm results.

In many cases, as the score is typically a scalar value (or a low rank vector), it may conceal the subtleties of candidate differences. Two candidate designs may receive a similar score, yet are quite different by some other evident nature which is not detected by the score itself.

For example (see FIG. 17) connecting two electrical outlets positioned on the same wall may exhibit the same score (if the score reflects cable length) for different connection pathways. The designer may favor (due to aesthetics or some other factor) a certain pathway shape, not reflected by the score itself.

In order to capture the differentiating factors, for each candidate plan the system may compute a score (which may be used for optimization) and populate a computed classification vector (list) of predefined design parameters which may be used for discrepancy evaluation. For example, the vector may include the number of connection pathway turns or bends, which provides some insight to the differences between routing candidates of the previous example (FIG. 17).

An automatic learning process (such as a re-enforcement learning algorithm) may be deployed using the feedback given by the designer's choices. When a designer is given N candidate routing plans, and eventually chooses one of them, the feedback given includes the scores and classification vectors of all N candidates in addition to the decision itself which states the chosen candidate versus (N−1) "disqualified" candidates. A learning process may evaluate the classification vector differences (e.g., Euclidean distances) between the disqualified candidates and the chosen candidate.

The learning process may eventually weight the different dimensions of the classification vector and/or may emphasize, or weight higher, dimensions which present the greatest impact on the design choice, relative to dimensions which present lesser impact. For example, a supervised learning process at which the user has indicated its design choices by labeling a corresponding vector which represents the design (e.g., credentials including the optimization results, path and node data etc.) may effectively favor a specific design consideration (known to the user) by a evaluating a certain linear combination of the vector elements. For example and for simplification purposes only, the weights of the vector elements can all be zero while one element has a non zero weight, indicating that this specific element has the greatest impact on the likelihood of a design being selected and preferred by the user. In return, or conversely, this may be used for differentiating between candidates of future design recommendations.

A method for presenting to the designer N candidates is shown in FIG. 18; all or any subset of the illustrated operations may be provided and may be performed in any suitable order, e.g. as shown. The method may include all or any subset of the following operations (aka "flow e") which may be performed in any suitable order, e.g. as shown:

Operation e1: Select the next available net arrangement.

Operation e2: Initialize logical graph weights and score to zero

Operation e3: Using a 2D routing algorithm, the best plans M are derived, and their associated graph scores are computed.

Operation e4: If no more net arrangements available, then go to operation e5. Typically, after analyzing all possible nets, there are K×M candidate plans.

Operation e5: The system may select N plans out of K×M plans. The selection process may be done either by score or a preference learning method which may tweak the selection process based on historical preference choices (e.g., re-enforcement learning).

An example of a method for learning preferences for the routing design process involving a human designer in the loop is the following "flow f"; here and in all flows herein, all operations or any subset may be provided, and may be performed in any suitable order e.g. as shown, or as follows:

Operation f1: N initial routing plan candidates are derived (e.g. based on, or using the output of, the method of FIG. 18.

Operation f2: For each candidate the system may obtain its score and construct a classification vector using some predefined parameters to be extracted or computed from the candidate routing plan itself. These parameters may be either direct results of the plan itself, or computed arguments (e.g., total length of wires, number of pipe bends per pipe length, etc.).

Operation f3: Optionally some information based on the score, or the classification vector is presented to the designer, in addition to the candidate routing plan, assisting with the selection process. The system may conceal this information from the designer to eliminate judgment bias. If a plan is displayed with a higher score, the designer might "adjust" his plan choice to favor such a plan. If it is desired to recover or learn a human designer's considerations, such biases may be best avoided e.g. by concealing.

Operation f4: The designer chooses (selects) one candidate.

Operation f5: The score and classification vector values of all candidates are used to create the feedback for a preference learning method (e.g. re-enforcement). The feedback includes the selection label (selected, not selected), the scores, and vector values. It may be that the designer is actually labeling (grading) different plans. The label reflects a grade or a score that the designer provides for the specific design choice. This information may be useful when creating a classification system (e.g. machine learning based) for identifying preferred routing plan choices. For new routing tasks, the method may mark in advance, based on previous labeling assignments, the preferred plan choices.

Operation f6: The feedback may include a vector function-based difference computation (e.g., Euclidean distance) between a rejected candidate and the selected candidate.

Operation f7: Optionally, the preference learning method modifies a weight vector matching the dimensions of the classification vector, which may be used for emphasizing vs. de-emphasizing the impact of various dimensions of the classification vector the preference of the designers e.g. As described above.

Operation f7 may (e.g. As described above with reference to operation f5) be replaced by a classification method which predicts preferred choices. The methods used when searching for optimized routing plans, may remain unchanged, e.g. may be as described elsewhere herein, while top choices may be graded by the classification systems. In this case, even if several plans have received the same optimization score (e.g., satisfying the optimization criteria at the same level), then the classification process mentioned in operation f5 may differentiate between such plans, based on the likelihood that the designer may prefer them. The preference learning method may be used for selecting top-N candidates for all design processes.

In certain embodiments, the methods de-couples between the layer of design rules which are dictated by engineering guidelines or regulations, which the optimization process employs, while searching for an optimal routing plan, and the layer of inner rules which are dictated by human oriented design preferences, which are subject to change. While the optimal routing plan may deal with metrics which measure direct physical aspects of the routing problem, such as the length of routing paths and cost of labor, the inner rules are guided by aspects as other design benefits, such as aesthetics (e.g., symmetry). In this case, certain feature measurements may be created for assessing these benefits. For example, a metric that measures the distribution uniformity of electrical sockets on a wall may be the standard deviation of socket locations from the center of mass of all sockets (the average 2D location of all sockets on the wall).

In addition, in order to favor the influence of experienced and professional designers on the behavior of the routing plan process, a metric may be used to take this into account. A designer who may make some poor choices, may educate the system to wrongly prefer certain choices. The system could be balanced correctly by using a variable set according to the seniority level of the designer, or a variable which reflects the consistency of choices made by the designer. For example, if the average number of cable bends per length reflects an aspect of design tendencies (e.g., the designer favors bending, when applicable) then measuring its over-time between different design activities of the same designer may reflect consistency. If this metric is tracked over time, then any deviation may be regarded as inconsistency and may deemphasize current recommendations by the designer relative to previous recommendations made by the designer. For example, the training algorithm which tracks user selections may be paused and training may stop until further notice with respect to the specific user.

Method 0 is a method, provided according to certain embodiments and useful for resolving a 3D optimization problem which may include finding an optimal resource routing plan for 3D spaces within buildings or other structures, or identifying a most efficient or optimal routing plan (e.g. resource routing plan) for a given 3D room/common area. The optimization criteria may, for example, include minimum materials used and/or minimal work effort and/or minimum cost.

Method 0 typically includes all or any subset of the following operations, suitably ordered e.g. as follows:

Operation Ia. Providing geometrical 3D data including a 3D representation (aka 3D setup) of a room or common area or any architectural space within a building or other structure, which may be separated by walls and/or partitions from other parts of the building/structure.

Operation Ib. Deriving, from the 3D representation, plural 2D arrangements e.g. net arrangements.

It is appreciated that there is a known, finite number of possible 2D net arrangements, per polyhedron e.g. per cube (see for e.g. FIG. 2). Thus, nets may be stored in advance and selected according to need. The system may define any cube face as the starting point for the nets (e.g. of FIG. 2) or the cube (say) may be pre-positioned or predefined e.g. the ceiling as the top face, the floor as the bottom face etc. FIGS. 19*a*-19*b* illustrate a possible way to store a net arrangement.

It is appreciated that there may be plural routing plans for a single 2D arrangement or net arrangement.

Operation II. Selecting a "best" 2D arrangement from among the plural 2D arrangements, including:

- For each 3D>2D conversion (aka net arrangement aka 2D conversion plan):
  - generating a logical graph representing any required connections between different nodes; and
  - generating score for that graph; and
- generating an output indicating that the net arrangement which had the best score, is deemed "best".

Typically, given a graph with nodes N1, N2, N3 . . . . where the weights of the edge between each Ni to Nj is Wij, the score is a suitable function of these weights, F(W11, W12, . . . ). For example, for every pair of nodes Ni and Nj the score may be derived by computing either the sum or product (multiplication) of the weights of the edges forming a path between them and as there can be more than one path the score can be set to the maximum or minimum value (e.g. as the optimization criteria dictates) obtained.

A node in a graph may be a connection point. for example, an electrical outlet may be a node, in an electrical network. a connecting point, e.g. on the wall, of a water tap is a node in a water network, and draining points and taps may be nodes if the network is sewage. When the node is connected to its network the resource (water, electricity etc.) is delivered to the node, and, typically, not otherwise. nodes may be connected among themselves.

Typically, "connecting" guidelines or considerations may dictate that there must be a connection between a given pair of nodes (e.g. node a should be connected to node b) but the design considerations typically do not dictate how the pair of nodes should be connected. For example, if "node A" is on one wall and "node B" is on another wall, the connection may be a straight line, may go through the ceiling first, and so forth.

The logical graph, generated for each net arrangement, includes edges or paths interconnecting certain pairs of nodes. Each such edge may be assigned a weight, reflecting the cost of interconnecting that pair of nodes, subject to the specific net arrangement. According to one embodiment, the weight of the edge connecting nodes A and B in a water network, may be the cost of the pipe of the specific length, within the walls, that interconnect nodes A and B. Thus, to compute this weight, the system computes the length of the path between nodes A and B, within the walls, subject to the specific net arrangement. For example, in one ("first") net arrangement, nodes A and B may lie within edge-joined polyhedron faces (whether two walls, or a wall and a ceiling, or a wall and a floor) which have a common edge. In another ("second") net arrangement, nodes A and B may lie within faces (whether two walls, or a wall and a ceiling, or a wall and a floor) which lack a common edge. The cost of the edge between nodes A and B may be smaller under the first net arrangement than under the second net arrangement. Thus, each logical graph includes connections or edges between nodes A, B, C, . . . and these connections or edges are each associated, in memory, with a price/penalty which varies between net arrangements.

An advantage of certain embodiments is that a designer may select a proposed position for nodes "A" "B" "C" in a room, and then run a program which typically outputs both a plan and its cost. The designer may then change the location of, say, "B" and run the program again to see if the "cost" or "plan" changed dramatically etc. Each time the program runs, a best plan and its cost may be computed.

The output typically comprises an electronic file which may be fed directly to actuators such as machines to cut wires/pipes, etc. and/or may provide inputs to other software programs e.g. software which identifies materials to purchase and/or may be translated to a format which human beings may read or view, thereby to facilitate training the system based on human" preferences.

The output may be a digital file storing a routing plan, which may, for example, be fed to and be processed by inventory management software, which checks current inventory for wiring cable availability, and creates a purchase order if needed. Alternatively or in addition, the file may be fed to software which converts data in the file (e.g. connect node A to B by wire 78 cm . . . ) to generate an instruction booklet for manual or commands to an automated wall or face fabrication system.

If there are plural networks e.g. electricity, water, the above method 0 may be performed for each network separately, since, typically, each network resource has its own regulations/considerations/etc. There may also be regulations or rules affecting two networks e.g. maintaining certain minimum distances between electrical lines and water pipes.

Method 0 may be used as-is, e.g. without any "preference learning function". The method typically yields the best option available (the best possible routing plan e.g.), for a given room/common space, which may be used to route resources for that room/common space. According to certain embodiments, the system generates a best option and then asks the end-user to indicate whether this routing plan is acceptable or not (e.g. binary rating by end-user), from which the system may learn.

According to certain embodiments, a conventional routing algorithm is employed to produce routing plans, from among which a "best" plan may be determined. The routing algorithm typically generates at least one route or path between network nodes. The input to a routing algorithm may include desired connectivity between network nodes, and may also include link cost (e.g. what are the respective costs of directly linking or connecting each pair of nodes in the network).

Alternatively, a system may be provided which is configured to "learn preferences". In such embodiments, typically, a user is given more than one option or alternative (plural routing plans e.g.) from which the user may select, e.g. by modifying method [0] to generate more than one candidate routing plan. One embodiment for doing this is described herein with reference to FIG. 18.

The method of FIG. 18 typically includes all or any subset of the following operations, suitably ordered e.g. as follows:

Operation 1800: For each possible K net arrangements

Operation 1810: Set net to current net arrangement

Operation 1820: Initialize graph weights and score to zero

Operation 1830: Find or adjust M routing plan candidates for net

Operation 1870: Derive corresponding graph weights

Operation 1880: Compute graph score

Operation 1890: The method may keep M best plans (highest score) and may go to operation 1830 while routing plan optimization is not done, or until this optimization is done. this may be done by having a background optimization routing plan process which seeks for the best plan while the system keeps n-best options until the process converges (e.g. gradient search ends) at which point the process may repeat itself.

Operation 1920: Best M plans for net chosen

Operation 1940: Next net

Operation 1950: Present N best plans overall (out of K*M plans)

Typically, in the embodiment of FIG. 18, m best alternatives (e.g. m best routing plans) for each net arrangement from among k net arrangements (net arrangements 1 . . . k) are shown. In total, for all k net arrangements m*k alternatives are obtained (e.g. routing plans), from among which, n best (highest scoring) routing plans may be selected, from among the m*k routing plans.

It is appreciated that the number of good or best plans may be smaller than expected. The system may still present plans to the user, even if there is only one routing plan available to be presented to the user, in which case the user may be prompted to "accept" or "reject" the routing plan. Thus, even if the routing algorithm may produce only one routing plan, there may still be m alternatives in the end, in which case the system may submit n of them to the user n (given that m>n).

It is appreciated that the methods of FIGS. 15, 16 and flows a, b (aka the Group I methods) are useful for optimizing a room (see e.g. FIG. 15) and/or for optimizing a common area (which may undergo preprocessing as per flow a below; this preprocessing, according to certain embodiments, prepares the "common area" to resemble a room after which method 0 may be applied to the pre-processed common area.

Specifically:

FIG. 15 is a method for optimizing a routing plan for a room.

The method of FIG. 15 typically includes all or any subset of the following operations, suitably ordered e.g. as follows:

Operation 1510: For each possible net arrangement

Operation 1520: Set net to current net arrangement

Operation 1530: Initialize graph weights and score to zero

Operation 1540: Find or adjust routing plan candidate for net

Operation 1550: Derive corresponding graph weights

Operation 1560: Compute graph score

Operation 1570: Store plan and score if highest score until now and go to operation 1540 if optimization process not finalized Operation 1580: Best plan for net chosen Operation 1585: Next net Operation 1590: Identify best plan overall.

Thus, in operation 1540, the system may find or adjust at least one routing plan candidate for a given net.

For example, if it is needed to connect node A to B, the system first determines which passages, between which faces X and Y, are allowed. The system then generates a connector that goes only through faces which are allowed to pass between each other, and which comply with any other guidelines (regulations/maintenance/craftsmanship). Once all connectors have been generated, the system may compute the weights for each edge between each connected pair of nodes (e.g. by computing the cost of the connector just generated between them). The system may apply a routing algorithm (e.g. "traveling salesman" etc.) and derive the best routing plan for this net arrangement. The system typically runs over all net arrangements and finds the better net arrangements.

Any suitable method may be employed to determine whether two nodes on a specific net arrangement may be connected by a straight line which resides within the net, such as the following method J; any or any of the following operations may be performed, in any suitable order e.g. as follows:

Operation j-1) Load net arrangement

Operation j-2) Get coordinates of point A(Xa,Ya) and point B(Xb,Yb) and set status flag F to 'False' Operation j-3) Derive straight line equation y=mx+n which passes between A and B (compute slope and intercept)

Operation j-4) Define processing step D as D=|Xb−Xa|/N where N is an integer (Note: N should be large enough so D is less than 1% or some acceptable resolution for not missing face border line crossings).

Operation j-5) Initialize Xq=Xa

Operation j-6) compute Yq=mXq+n

Operation j-7) Is (Xq,Yq) within the net arrangement boundaries (on cube faces)? If NO then go to step 11

Operation j-8) Increase Xq by D, Xq=Xq+D

Operation j-9) If Xq>Xb then set status flag F to 'true' and go to Operation J-11

Operation j-10) Goto Operation j-(6)

Operation j-11) Exit

If A,B may be connected by a straight line which is within the net, then the status may indicate F='TRUE'.

Method J may be modified, if for example there are certain faces which cannot be passed through, e.g. as in the following method K; any or any of the following operations may be performed, in any suitable order e.g. as follows:

Operation k-1) Load net arrangement

Operation k-2) Get coordinates of point A (Xa,Ya) and point B (Xb,Yb) and set status flag F to 'False'

Operation k-3) Derive straight line equation y=mx+n which passes between A and B (compute slope and intercept)

Operation k-4) Define processing step D as D=|Xb−Xa|/N where N is an integer (Note: N should be large enough so D is less than 1% or some acceptable resolution for not missing face border line crossings).

Operation k-5) Initialize Xq=Xa

Operation k-6) compute Yq=m*Xq+n

Operation k-7) Determine by (Xq,Yq) the specific face it is located on.

Operation k-8) Was a face located? If NOT, then go to Operation k-13 (no face means out of boundaries)

Operation k-9) Is the face allowed to be passed through? If NOT, then go to

Operation k-13

Operation k-10) Increase Xq by D, Xq=Xq+D

Operation k-11) If Xq>Xb then set status flag F to 'True' and go to Operation k-13

Operation k-12) Goto Operation k-(6)

Operation k-13) Exit

It is appreciated that the method may, alternatively or in addition, be modified to include restrictions such as checking if crossing from one particular face to another is allowed, or any other restriction which is constructed from a particular set of restrictions (e.g., cannot cross face Fn if at any prior step Fm was crossed). It is appreciated that the method may, alternatively or in addition, be modified to use any function y=g(x) rather than using a straight line. It is appreciated that the method may, alternatively or in addition, be modified (e.g. by modifying the step process) to increase only Xq or only Yq depending on the net face and, by doing so, moving in vertical or horizontal lines.

FIG. 16 is a method for optimizing a routing plan for a common area (coupling between rooms) which typically includes pre-processing, after which the method of FIG. 16 calls (e.g. in its last step) a method for optimizing a routing plan for a room e.g. FIG. 15.

The method of FIG. 16 typically includes all or any subset of the following operations, suitably ordered e.g. as follows:

Operation 1610: Resolve any coupling requirements between adjacent rooms

Operation 1620: Identify Common Area

Operation 1630: Identify Mediation Point (if needed)

Operation 1640: Construct Common Area Logical Graph

Operation 1650: Identify all possible Net Arrangements of Common Area

Operation 1660: Use Optimization Criteria for deriving optimal plan e.g. as per FIG. 15.

Flows a and b, when performed together, form a method for optimizing a routing plan, including pre-processing which may occur when optimizing a routing plan for a common area, before calling a method for optimizing a routing plan for a room e.g. the method of FIG. 15.

All or any subset of the operations of flow b may respectively replace all or any subset of operations 1640, 1650 and 1660 of FIG. 16, and vice versa.

The methods of flows c, d, aka the group 2 methods are useful for use-cases in which it is desired to execute group 1 for each of n>1 resource networks (e.g. water, electricity). Each network typically has its own design goals and/or typically is subject to its own restrictions, hence each network may require its own optimization plan aka routing plan which may be generated by applying method [0] and/or method/s from group [1] for each network. The order of "routing" each network may affect results (e.g. if "WIRE X CANNOT CROSS "PIPE Y", or, more generally, if any clash between elements of one network such as water, and another network such as electricity, is defined as impermissible, then positioning pipe y and later positioning wire x, typically leads to different results than when wire x is positioned before positioning pipe y. Thus, the order of optimization is typically changed, and software according to any embodiment herein may be run using both the first order and the second order, and the results are compared e.g. manually, to select optimal electrical wiring and optimal water pipe design which do not clash, using any suitable selection criteria.

Example: a program configured according to any embodiment herein may be run in order to determine an electrical routing plan for an electrical network in a given building, room or architectural structure, and then the program, configured according to any embodiment herein, may be run in order to determine a water routing plan for the water network in the same building, room or architectural structure. In addition, however, the program configured according to any embodiment herein may be run again to determine, first, a water routing plan for a water network in the building, room or architectural structure, and then, the program configured according to any embodiment herein, may be re-run in order to determine an electrical routing plan for the electrical network in the building, room or architectural structure. The resulting electrical and water routing plans, generated working in one order (electrical first), may be compared to electrical and water routing plans, generated working in another order (water first).

Similarly, if there are N networks rather than 2, a program configured according to any embodiment herein may be run first on one ordering of the N networks e.g. first network1, then network2, . . . then network N (first ordering), and then on other orderings of the N networks e.g. first network 2, then network1, then network 3, . . . then network N (second ordering), and first network 3, then network1, then network 2, then network 4, . . . then network N (third ordering).

Specifically, the method of flow d typically comprises a multiple resource routing algorithm and the method of flow c typically includes pre-processing for the method of flow d.

The methods of FIG. 18 and flows e, f, aka the Group 3 methods, are useful for learning at least one end-user's routing plan preferences by:

a. presenting, to the end-user, plural "good" options or plural alternatives for optimizing a routing plan for a common area or room, and/or
b. tracking over time, or learning from, the end-user's selections of routing plans; and/or
c. using an output from the tracking or learning (e.g. using an end-user's selections) to train a reinforcement algorithm or perform reinforcement learning e.g. as described herein or as known in the art. Any data known to the system about each presented routing plan (e.g., scores and/or whether the plan was selected or not, and/or whether the plan was accepted or rejected, and/or how a plan was rated) may be used as "credentials" to feed back information for any suitable reinforcement learning or machine learning module which is typically running in the background.

For example, the system may be routing a specific room. The system may present or display to the user two "best" routing plan alternatives for this room e.g. as shown in FIGS. 20*a* and 20*b*. The user may have human insight as to why the routing plan of FIG. 20*a* is better (or worse) than the routing plan of FIG. 20*b*, e.g. as shown in FIG. 17. Assume that the optimization goal or criterion was minimum wiring length. All options illustrated in FIG. 17 have the same wiring length, but the user may not favor the routing plan on the right, which, in his opinion, has too many wire bends. The system, by learning from this end-user and other end-users like him, may eventually learn that the number of wire bends is a hidden characteristic which should influence the optimization process.

Typically, the end-user's selections of routing plans may include rating or labelling objects (e.g. routing plans or designs) as either "excellent" or "good enough".

The system may be configured to measure "goodness" of the object e.g. relying on an object's "credentials" (any recorded/computed characteristics of the object). A supervised learning algorithm may be provided which eventually learns how to correctly derive, from an object's credentials (even for a new object), an indication of whether the object e.g. routing plan, is excellent, or merely good enough, without requiring recourse to a human user.

According to certain embodiments, after a suitable number of objects have been human user-evaluated, hence used to train the machine, the machine may move into an advanced mode, in which the machine is configured to start guessing how the user may rate a new object.

According to certain embodiments, an interim stage is provided in which the machine generates guesses, and observes if its guesses are correct, by continuing to rely on human end-users. In this embodiment, typically, there is no change in the selection-of-alternatives process (e.g., in FIG. 18, selection of n from among m*k), nor in presentation of alternatives to the user. The user selections at this stage may be used to further train the algorithm for improving the prediction, and/or may indirectly measure the accuracy of the prediction e.g. by tracking frequency of predicting the "excellent" design correctly, over time. For example, if the machine detects that it correctly guesses "10-in-a-row", the current algorithm may be deemed "good enough" to move into a next stage or more advanced mode. At this stage, the selection process (e.g. N out of m*k, see FIG. 18) may be modified. Prior to this intervention, both the m*k alternatives, and later the n out of m*k alternatives, were selected, based on an optimization score. Now that the machine has better knowledge on user preferences, this "preference" prediction (likelihood to be selected as the preferred solution) score may be applied to bias selections.

The system may, for example, pick n out m*k plans, based on an optimization score. Routing plans may be presented in order, the order being determined according to each routing plan's likelihood, as learned by the machine or system, to be chosen as the preferred solution e.g. based on the previous algorithm prediction. Alternatively or in addition, the system may pick the n out of m*k plans based on a weighted score, taking into account the optimization score and the likelihood to be a preferred solution.

Typically, whichever n alternatives are presented, the user makes its selection and all data is recorded, typically including n-alternative optimization data and/or likelihood scores, and/or whether this routing plan was selected by user. This is fed back to the reinforcement algorithm.

According to certain embodiments, the system (e.g. its reinforcement learning or machine learning) computes or measures a difference between a routing plan deemed "excellent" by a user, and another plan.

According to certain embodiments, the system provides, for each routing plan presented to the user, a vector or list of parameters which are the "credentials" of that particular plan (e.g. the plan's score, graph weights and any other available data). The system may add to the credentials data indicating whether this plan was "chosen" or "not-chosen" by the user, and/or any other indication that the plan has been "labelled" as excellent, or just good. So, for every presented plan Pi, the system may feed back plan i's credential vector Ci and a flag Fi [say, "true" if chosen by user, "false"—if not chosen]. According to certain embodiments, the system computes or measures:

optimization parameters including any variable used to process the optimization score and the score itself. For example, if the goal is to minimize the cost of each routing plan, the cost is typically a function of material cost and labor cost inter alia. The material cost may be a function of wiring length and any other materials which may be required for the installation or interconnection of two nodes (as opposed to fixed costs which are independent of the routing plan). The optimization parameters may comprise a vector or set of values, typically including all or any subset of the above variables and the optimization score; and/or likelihood of being selected by the system or by an end-user as a preferred or excellent solution e.g. as described above. The system herein typically uses an algorithm which is trained to, eventually, predict if a specific plan will be selected as an "excellent" plan by the user (and may estimate how likely this routing plan is to be thus selected; this estimate is termed herein a likelihood score).

Typically, for each of the n-presented plans (e.g. the n out of m*k alternatives) there is a vector VI which relates to the optimization process, and another vector UI which includes values including an indication of the likelihood of that routing plan being selected and/or if that routing plan was actually selected (and/or the order of preference if the user was given an opportunity to sort his preferences as being more or less desirable/acceptable).

When reinforcement learning is used, an agent may learn an optimal, or nearly-optimal, policy that maximizes a "reward function" or other user-provided reinforcement signal that typically accumulates from immediate rewards. Typically, as described in Wikipedia (https://en.wikipedia.org/wiki/Reinforcement learning), a reinforcement learning agent interacts with an environment, typically in discrete time steps e.g. as follows: at each time t, the agent receives a current state s_t and reward r_t. The agent then chooses an action a_t, from a set of available actions; at may be sent to the environment which moves to a new state s_(t+1); the reward r_(t+1) associated with the transition (s_t,a_t,s_(t+1)) is determined. The reinforcement learning agent then learns a policy, typically including mapping a set of available actions and states into an interval [0,1] by computing, for each pair of actions and states, the conditional probability that action a_t=a, given that state s_t=s. the agent typically maximizes the expected cumulative reward.

The agent may include any of the methods shown and described herein e.g. software configured to perform such methods.

Still with reference to the group 3 methods, it is appreciated that the method of FIG. 18 typically involves a "designer-in-the-loop" and may be a modification of method [0] which remembers plural candidates (not only one, as is the case for method 0). The output of this method typically includes n initial routing plan candidates.

It is appreciated that operations 2-5 of flow e may be respectively replaced by operations 1820, 1830, 1940, 1950 of FIG. 18, and vice versa. The first operation (e.g.) in the method of flow f may use FIG. 18's output.

It is appreciated that terminology such as "mandatory", "required", "need" and "must" refer to implementation choices made within the context of a particular implementation or application described herewithin for clarity, and are not intended to be limiting, since, in an alternative implementation, the same elements might be defined as not mandatory, and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order, including simultaneous performance of suitable groups of operations, as appropriate. Included in the scope of the present disclosure, inter alia, are machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The system may, if desired, be implemented as a network—e.g. web-based system employing software, computers, routers and telecommunications equipment, as appropriate.

Any suitable deployment may be employed to provide functionalities e.g. software functionalities shown and described herein. For example, a server may store certain applications, for download to clients, which are executed at the client side, the server side serving only as a storehouse. Any or all functionalities e.g. software functionalities shown and described herein, may be deployed in a cloud environment. Clients e.g. mobile communication devices such as smartphones, may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if -then" logic described herein is intended to include embodiments in which a processor is programmed to repeatedly determine whether condition x, which is sometimes true and sometimes false, is currently true or false, and to perform y each time x is determined to be true, thereby to yield a processor which performs y at least once, typically on an "if and only if" basis e.g. triggered only by determinations that x is true, and never by determinations that x is false.

Any determination of a state or condition described herein, and/or other data generated herein, may be harnessed for any suitable technical effect. For example, the determination may be transmitted or fed to any suitable hardware, firmware or software module, which is known or which is described herein to have capabilities to perform a technical operation responsive to the state or condition. The technical operation may, for example, comprise changing the state or condition, or may more generally cause any outcome which is technically advantageous given the state or condition or data, and/or may prevent at least one outcome which is disadvantageous, given the state or condition or data. Alternatively or in addition, an alert may be provided to an appropriate human operator or to an appropriate external system.

Features of the present invention, including operations which are described in the context of separate embodiments, may also be provided in combination in a single embodiment. For example, a system embodiment is intended to include a corresponding process embodiment, and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art, and particularly, although not limited to, those described in the Background section or in publications mentioned therein.

Conversely, features of the invention, including operations, which are described for brevity in the context of a single embodiment or in a certain order, may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise all or any subset of the operations illustrated or described, suitably ordered e.g. as illustrated or described herein.

Devices, apparatus or systems shown coupled in any of the drawings may in fact be integrated into a single platform in certain embodiments, or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation, and is not intended to be limiting.

Any suitable communication may be employed between separate units herein e.g. wired data communication and/or in short-range radio communication with sensors such as cameras e.g. via WiFi, Bluetooth or Zigbee.

It is appreciated that implementation via a cellular app as described herein is but an example, and, instead, embodiments of the present invention may be implemented, say, as a smartphone SDK; as a hardware component; as an STK application, or as suitable combinations of any of the above.

Any processing functionality illustrated (or described herein) may be executed by any device having a processor, such as but not limited to a mobile telephone, set-top-box, TV, remote desktop computer, game console, tablet, mobile e.g. laptop or other computer terminal, embedded remote unit, which may either be networked itself (may itself be a node in a conventional communication network e.g.) or may be conventionally tethered to a networked device (to a device which is a node in a conventional communication network or is tethered directly or indirectly/ultimately to such a node).

Any operation or characteristic described herein may be performed by another actor outside the scope of the patent application and the description is intended to include apparatus, whether hardware, firmware or software, which is configured to perform, enable, or facilitate that operation, or to enable, facilitate or provide that characteristic.

The terms processor or controller or module or logic as used herein are intended to include hardware such as computer microprocessors or hardware processors, which typically have digital memory and processing capacity, such as those available from, say Intel and Advanced Micro Devices (AMD). Any operation or functionality or computation or logic described herein may be implemented entirely or in any part on any suitable circuitry including any such computer microprocessor/s as well as in firmware or in hardware or any combination thereof.

It is appreciated that elements illustrated in more than one drawing, and/or elements in the written description, may still be combined into a single embodiment, except if otherwise specifically clarified herewithin. Any of the systems shown and described herein may be used to implement or may be combined with, any of the operations or methods shown and described herein.

It is appreciated that any features, properties, logic, modules, blocks, operations or functionalities described herein, which are, for clarity, described in the context of separate embodiments, may also be provided in combination in a single embodiment, except where the specification or general knowledge specifically indicates that certain teachings are mutually contradictory and cannot be combined. Any of the systems shown and described herein may be used to implement, or may be combined with, any of the operations or methods shown and described herein.

Conversely, any modules, blocks, operations or functionalities described herein, which are, for brevity, described in the context of a single embodiment, may also be provided separately, or in any suitable sub-combination, including with features known in the art. Each element e.g. operation described herein, may have all characteristics and attributes described or illustrated herein, or, according to other embodiments, may have any subset of the characteristics or attributes described herein.

The invention claimed is:

1. A method for deploying at least one physical connector within faces, comprising at least one of walls, ceilings and floors, of an architectural structure, wherein each physical connector interconnects physical locations along the faces of the architectural structure, the method comprising using a hardware processor for:

a. displaying a representation of a 3d architectural structure comprising a polyhedron which has faces corresponding to at least one of a wall, a ceiling and a floor of the structure, wherein the polyhedron defines plural 2 dimensional nets comprising polyhedral nets or net representations or net arrangements, b. accepting a human designer's selection of locations, on the faces of the polyhedron, at which to position physical resource nodes such as water outlets, electrical outlets, taps, sewer junctions, or intersections between physical connectors, wherein each node belongs to a physical resource network such as a water pipe network, electrical network or sewage network;

c. generating plural routing plans by at least one routing algorithm, wherein, in at least one initial mode of operation, the method prompts a user to rate at least some of the plural routing plans thereby to generate user ratings; and d. for each physical resource network within a set of physical resource networks which comprise at least one of: a water pipe network, a sewage pipe network, an electrical cable network, to be deployed in the architectural structure:

for each of the plural nets, generating a logical graph comprising logical nodes which represent at least some of said physical resource nodes respectively; and edges, which represent required physical connectors between said physical resource nodes, respectively and weights defined for each of the edges;

scoring each net's logical graph and, accordingly, selecting at least one best net from among the plural nets; and generating a digital file comprising computer-readable commands for an automatic fabrication system to deploy at least one physical resource node, and at least one of water pipes, sewage pipes, and electrical cables in the architectural structure according to a routing plan which interconnects plural nodes belonging to said physical resource network and which is derived from the logical graph generated for the at least one best net from among the plural nets.

2. The method according to claim 1, wherein nodes can only be interconnected by connectors or edges lying within edge-joined polyhedron faces.

3. The method according to claim 2, wherein at least two nets from among the plural nets differently define how pairs of first and second nodes, in first and second polyhedron faces, can be interconnected, because in one of the two nets, the first and second polyhedron faces are edge-joined and in another of the at least two nets, the first and second polyhedron faces are not edge-joined.

4. The method according to claim 1, wherein the architectural structure comprises a room.

5. The method according to claim 1, wherein the architectural structure comprises a common area coupling two rooms and wherein the method also comprises identifying the common area and pre-processing by identifying a mediation point in the common area and its location and connectivity requirements.

6. The method according to claim 1, wherein said generating and scoring is performed for each physical resource network within the set of networks, for a first ordering of the physical resource networks within the set of networks and is then performed again at least once, for each physical resource network within the set of networks, for at least one second ordering of the physical resource networks within the set of networks which differs from said first ordering, thereby to yield at least two best nets and wherein a selection is made between said at least two best nets thereby to define a most preferred net and then, at least one physical resource node, and at least one of water pipes, sewage pipes, and electrical cables in the architectural structure, are deployed according to the logical graph generated for the most preferred net.

7. The method according to claim 1, wherein said user ratings are used as labels in a supervised learning process.

8. The method according to claim 7, wherein after said supervised learning process has been repeated N times, the method generates its own system ratings for at least some routing plans, based on said supervised learning process, and compares said system ratings with said user ratings.

9. The method according to claim 8, wherein the method at least once presents plans to the human designer in order of the plans' system ratings thereby to increase likelihood of early presentation of a routing plan, to the human designer, which the human designer is likely to accept.

10. The method according to claim 1, wherein the method at least one pre-selects, in advance, plans which are more likely to be selected by the user thereby to bias optimization.

11. The method according to claim 1, wherein the method uses artificial intelligence to learn, over time, from the user, which routing plans are considered better and worse and wherein in at least one later mode of operation, the method automatically hence without resorting to a human user, selects at least one routing plan which is better over at least one routing plan which is worse, and at least one physical resource node, and at least one of water pipes, sewage pipes, and electrical cables in the architectural structure are then deployed according to a routing plan selected by the method as better rather than according to a routing plan selected by the method as worse.

12. A system for deploying at least one physical connector within faces, comprising at least one of walls, ceilings and floors, of an architectural structure, wherein each physical connector interconnects physical locations along the faces of the architectural structure, the system comprising at least one hardware processor configured to carry out:

a. displaying a representation of a 3d architectural structure comprising a polyhedron which has faces corresponding to at least one of a wall, a ceiling and a floor of the structure, wherein the polyhedron defines plural 2 dimensional nets comprising polyhedral nets or net representations or net arrangements, b. accepting a human designer's selection of locations, on the faces of the polyhedron, at which to position physical resource nodes, and other intersections between physical connectors, wherein each node belongs to a physical resource network;

c. generating plural routing plans by at least one routing algorithm, wherein, in at least one initial mode of operation, the system prompts a user to rate at least some of the plural routing plans thereby to generate user ratings; and d. for each physical resource network within a set of physical resource networks, to be deployed in the architectural structure:

for each of the plural nets, generating a logical graph comprising logical nodes which represent at least some of said physical resource nodes respectively; and edges, which represent required physical connectors between said physical resource nodes, respectively and weights defined for each of the edges;

scoring each net's logical graph and, accordingly, selecting at least one best net from among the plural nets, generating a digital file comprising computer-readable commands for an automatic fabrication system to deploy at least one physical resource node, and at least one physical connector in the architectural structure according to a routing plan which interconnects plural nodes belonging to said physical resource network and which is derived from the logical graph generated for the at least one best net from among the plural nets.

13. The system according to claim 12, wherein said physical connectors comprise at least one of: water pipes, sewage pipes, communication cables, optical fibers, and electrical cables.

14. The system according to claim 12, wherein a single logical graph, but for weights, is used for at least one of said plural nets.

15. The system according to claim 14, wherein a single logical graph, but for weights, is used for all of said plural nets.

16. The system according to claim 12, wherein the system has a first mode, mode [i], in which users are prompted to select better plans and/or rank or mark plans thereby to define user preferences, and a machine learning of said user preferences occurs without machine-modification of presented plans.

17. A non-transitory computer readable storage medium having computer readable program code embodied therein, said computer readable program code adapted to be executed to implement a method for deploying at least one physical connector within faces, comprising at least one of walls, ceilings and floors, of an architectural structure, wherein each physical connector interconnects physical locations along the faces of the architectural structure, the method comprising using a hardware processor for:

a. displaying a representation of a 3d architectural structure comprising a polyhedron which has faces corresponding to at least one of a wall, a ceiling and a floor of the structure, wherein the polyhedron defines plural 2 dimensional nets comprising polyhedral nets or net representations or net arrangements, b. accepting a human designer's selection of locations, on the faces of the polyhedron, at which to position physical resource nodes such as water outlets, electrical outlets, taps, sewer junctions, or intersections between physical connectors, wherein each node belongs to a physical resource network such as a water pipe network, electrical network or sewage network;

c. generating plural routing plans by at least one routing algorithm, wherein, in at least one initial mode of operation, the method prompts a user to rate at least some of the plural routing plans thereby to generate user ratings; and d. for each physical resource network within a set of physical resource networks which comprise at least one of: a water pipe network, a sewage pipe network, an electrical cable network, to be deployed in the architectural structure:

for each of the plural nets, generating a logical graph comprising logical nodes which represent at least some of said physical resource nodes respectively; and edges, which represent required physical connectors between said physical resource nodes, respectively and weights defined for each of the edges;

scoring each net's logical graph and, accordingly, selecting at least one best net from among the plural nets, generating a digital file comprising computer-readable commands for an automatic fabrication system to deploy at least one physical resource node, and at least one of water pipes, sewage pipes, and electrical cables in the architectural structure according to a routing plan which interconnects plural nodes belonging to said physical resource network and which is derived from the logical graph generated for the at least one best net from among the plural nets.

18. The non-transitory computer readable storage medium according to claim 17, wherein the system has an additional mode, mode [ii], in which the system guesses the user's preferences and accordingly, assesses its own accuracy and wherein a machine learning continues without machine-modification of presented plans.

19. The non-transitory computer readable storage medium according to claim 18, wherein the system has an additional mode, mode [iii], in which the system takes into account historical preferences by presenting plans to the user which comprise an optimized derivation and/or which are presented in an order biased by a likelihood that each plan will be chosen by the user and wherein the system transitions from mode ii to mode iii when said accuracy achieves a given accuracy threshold.

20. The non-transitory computer readable storage medium according to claim 17, wherein the system has an additional mode, mode [iii], in which the system takes into account historical preferences by presenting plans to the user which comprise an optimized derivation and/or which are presented in an order biased by a likelihood that each plan will be chosen by the user.

21. The non-transitory computer readable storage medium according to claim 20, wherein in mode [iii], the user continues to rank and/or mark and/or select and a machine continues to learn.

* * * * *